(12) United States Patent
White et al.

(10) Patent No.: US 10,508,894 B2
(45) Date of Patent: Dec. 17, 2019

(54) BRAKE COMPONENT MEASUREMENT TOOL

(71) Applicant: Hendrickson USA, L.L.C., Itasca, IL (US)

(72) Inventors: Jay D. White, Massillon, OH (US); Gregory W. Dvorchak, North Canton, OH (US); Ronald W. Davis, Jr., Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 173 days.

(21) Appl. No.: 15/626,463

(22) Filed: Jun. 19, 2017

(65) Prior Publication Data
US 2018/0003476 A1 Jan. 4, 2018

Related U.S. Application Data

(60) Provisional application No. 62/355,995, filed on Jun. 29, 2016, provisional application No. 62/430,989, filed on Dec. 7, 2016.

(51) Int. Cl.
*G01B 5/00* (2006.01)
*B60T 17/22* (2006.01)
(Continued)

(52) U.S. Cl.
CPC .......... *G01B 5/0028* (2013.01); *B60T 17/221* (2013.01); *G01B 3/20* (2013.01); *G01B 5/06* (2013.01); *F16D 66/02* (2013.01)

(58) Field of Classification Search
CPC .......... G01B 3/20; G01B 5/0028; G01B 5/06; B60T 17/221; F16D 65/12; F16D 66/02
See application file for complete search history.

(56) References Cited

U.S. PATENT DOCUMENTS 536,676 A * 4/1895 Wilcox ............ G01B 3/18
33/816
1,243,545 A 10/1917 Nefedov
(Continued)

OTHER PUBLICATIONS

"Instruction for the Bendix Air Disc Brake Pad and Rotor Gauge Tool", pp. 1-2. 2015 Bendix Spicer Foundation Brake LLC, May 2015.

*Primary Examiner* — Freddie Kirkland, III
(74) *Attorney, Agent, or Firm* — Dureska & Moore, LLC; David P. Dureska; Greg Strugalski

(57) ABSTRACT

A tool for measuring dimensions of disc brake components has an elongated first member. The elongated first member has a first tip extending transversely from the first member. The first tip has a first projection at an end portion of the first tip. An elongated second member is relatively movable to first member. The second member has a second tip extending transversely from the second member in the same direction as the first tip of the first member. The second tip has a second projection at an end portion of the second tip and extends in a direction towards the first projection. First indicia are provided on the first and second members to indicate the relative distance between the first and second projections when measuring an object located between the first and second projections. Second indicia are provided on the first and second members to indicate the relative distance between surfaces of the first and second tips when measuring spaced apart objects located outside of the first and second projections.

19 Claims, 12 Drawing Sheets

(51) Int. Cl.
*G01B 5/06* (2006.01)
*G01B 3/20* (2006.01)
*F16D 66/02* (2006.01)

(56) References Cited

U.S. PATENT DOCUMENTS

| | | | |
|---|---|---|---|
| 3,016,619 | A | 1/1962 | Mueller |
| 3,101,551 | A * | 8/1963 | Bryant ................ G01B 3/18 33/827 |
| 3,889,378 | A * | 6/1975 | Senecal ............ G01B 5/0028 33/610 |
| 4,033,043 | A | 7/1977 | Cunningham |
| 5,095,638 | A | 3/1992 | David et al. |
| 5,390,427 | A | 2/1995 | Heller et al. |
| 5,469,629 | A * | 11/1995 | Rogler ................ G01B 5/06 33/609 |
| 6,076,639 | A | 6/2000 | Dahlen et al. |
| 6,237,723 | B1 | 5/2001 | Salsman |
| 6,957,498 | B2 * | 10/2005 | Tsai .................... G01B 3/205 33/610 |
| 7,040,151 | B2 * | 5/2006 | Graham ........... G01B 5/0028 33/600 |
| 7,721,455 | B2 * | 5/2010 | Matsumiya ........... G01B 3/205 33/505 |
| 7,802,374 | B1 * | 9/2010 | Chen .................... G01B 3/205 33/784 |
| 7,845,091 | B2 | 12/2010 | Clark |
| 9,347,760 | B2 * | 5/2016 | Thorley ............ G01B 5/0028 |
| 9,500,462 | B2 | 11/2016 | Reble |
| 9,815,441 | B2 * | 11/2017 | Wu ........................ B60T 7/102 |
| 9,897,426 | B2 * | 2/2018 | Wu .......................... G01B 3/20 |
| 2016/0280200 | A1 * | 9/2016 | Esnouf .................. G01B 3/205 |

\* cited by examiner

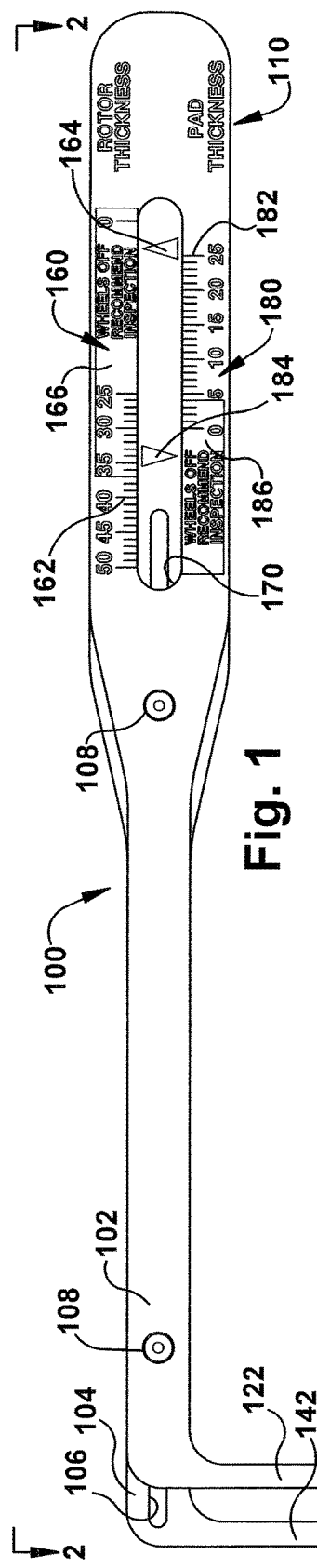
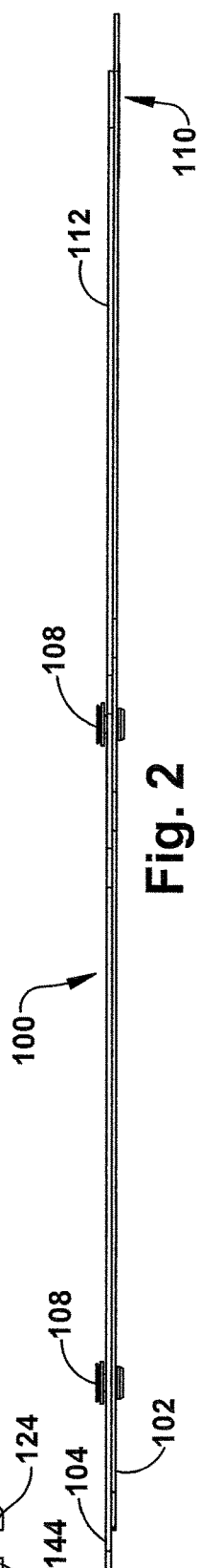
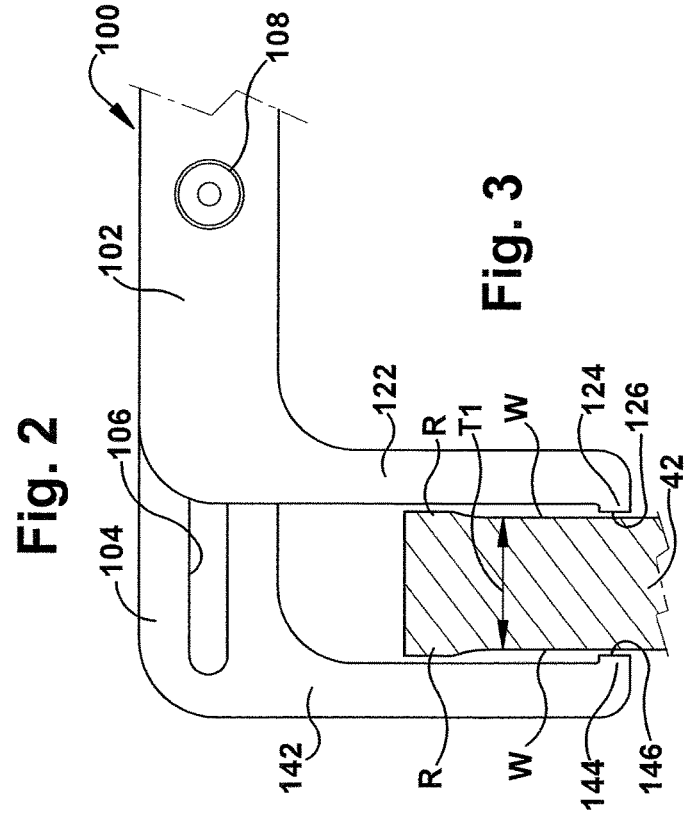

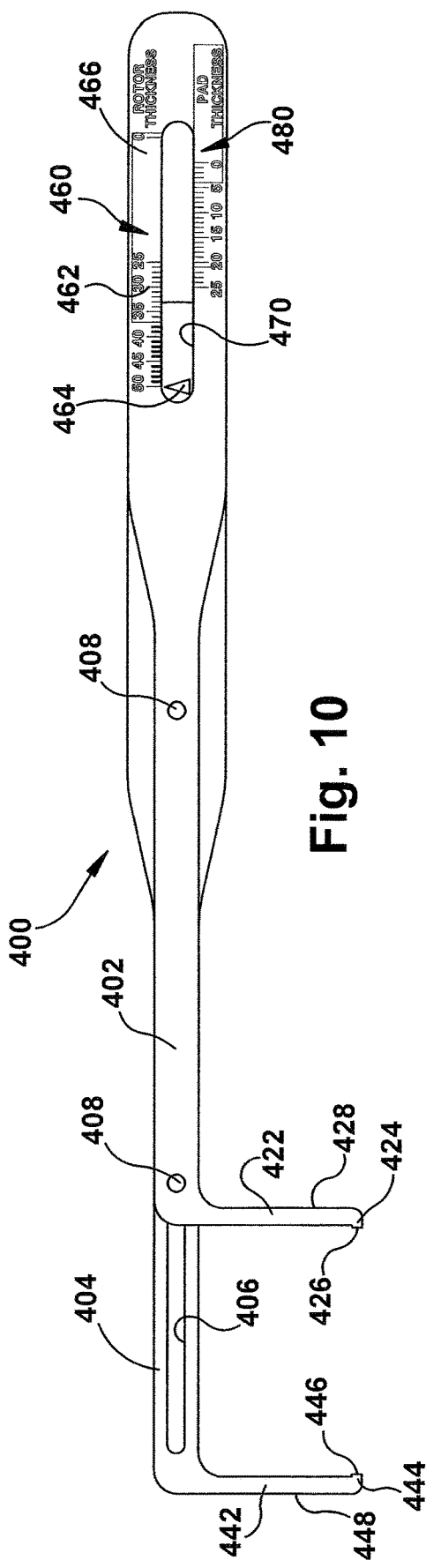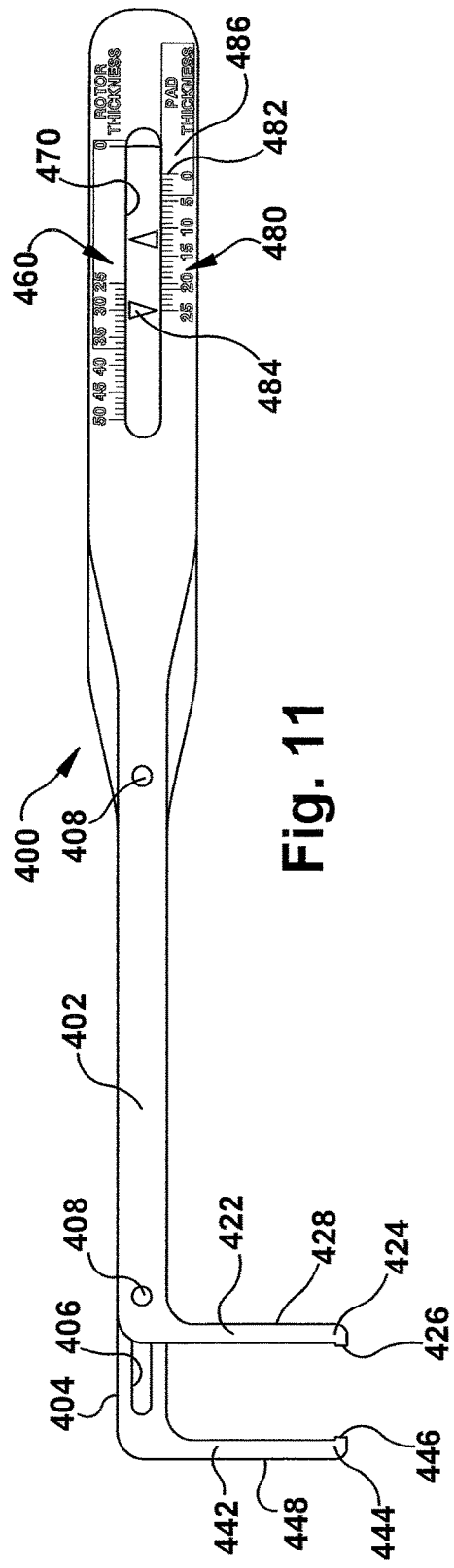

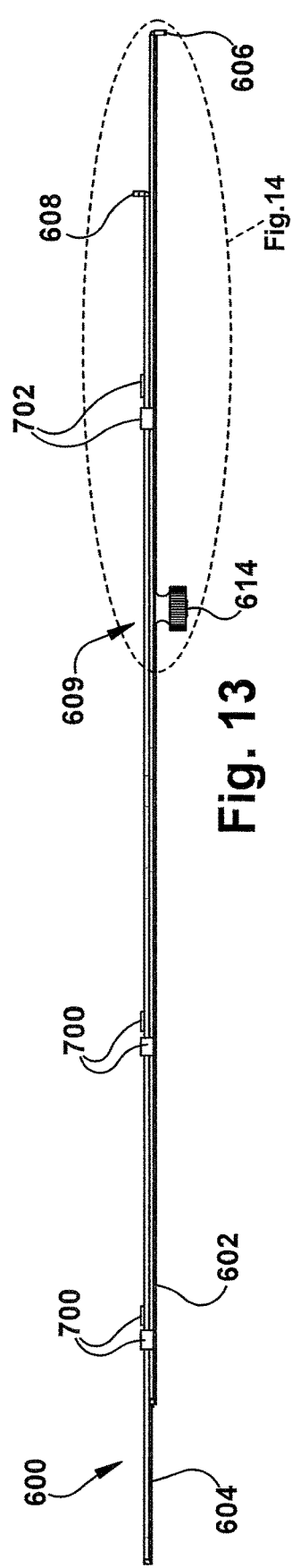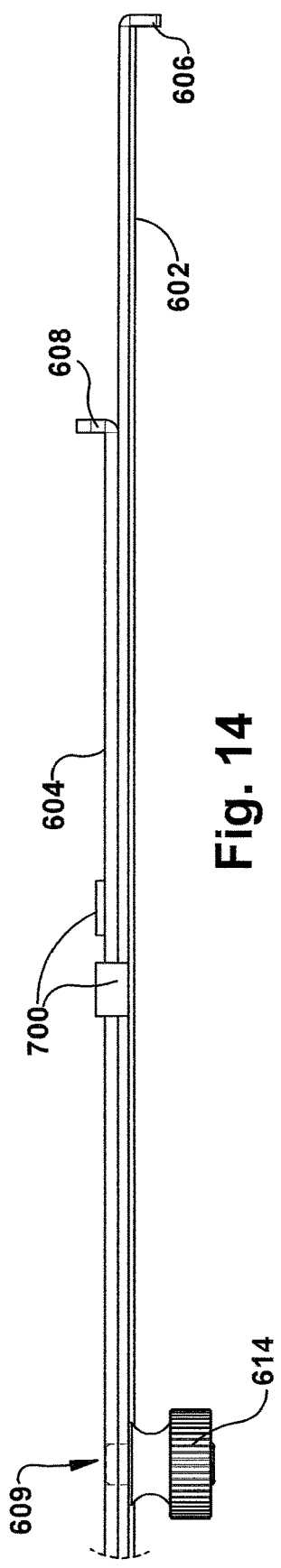

BRAKE COMPONENT MEASUREMENT TOOL

CROSS-REFERENCE TO RELATED APPLICATIONS

This application claims the benefit of U.S. Provisional Patent Application Ser. No. 62/355,995 filed Jun. 29, 2016 and Ser. No. 62/430,989 filed Dec. 7, 2016.

TECHNICAL FIELD

This disclosure relates generally to brakes for heavy-duty vehicles. Particularly, this disclosure relates to a tool for, and method of, measuring thicknesses of brake pads and rotors of heavy-duty vehicle air disc brake assemblies without having to remove tire and wheel assemblies.

BACKGROUND

Heavy-duty vehicles typically include trucks, tractors and trailers. Tractors often pull at least one trailer, and sometimes two or three trailers. The heavy-duty vehicles have axle/suspension systems with at least one transversely extending axle. A brake system, such as an air disc brake system, is associated with the axle/suspension system. The air disc brake system has a brake assembly mounted on each respective end of the axle. Each brake assembly typically includes a carrier, a caliper, a rotor and a pair of disc brake pads.

The heavy-duty vehicle also has multiple tire and wheel assemblies. Each tire and wheel assembly is also mounted on a respective end of the axle. The tire and wheel assembly generally surrounds the brake assembly and, thereby, limits or prevents easy access to the brake assembly for inspection and servicing.

The rotor and disc brake pads are subject to wear during the operation of the heavy-duty vehicle. Vehicle operators, fleet owners, service technicians and enforcement agencies periodically inspect and measure the thicknesses of the rotors and disc brake pads. Such measurements assure that these brake components are within recommended Out-Of-Service limits established by agencies, such as the Commercial Vehicle Safety Alliance (CVSA), or that the brake components require servicing and/or replacement. Obtaining precise and accurate measurements for the thicknesses of the rotor and disc brake pads can be difficult due to the limited access to the brake components when a tire and wheel assembly is mounted on the axle end carrying the brake assembly. It is often necessary to remove the tire and wheel assembly from the axle end to gain sufficient access to the rotor and disc brake pads for inspection and servicing. This can be a labor intensive and time-consuming procedure that takes up service technician time and removes the heavy-duty vehicle from service, thereby reducing the availability of the heavy-duty vehicle.

Previous attempts have been made to enable measurement of rotor and disc brake pads on a heavy-duty vehicle with tire and wheel assemblies mounted and had limited success. For example, one such previous tool has relatively movable jaws that span a rotor to determine a thickness. However, the jaws often engage an outermost area of the rotor that may not be contacted and worn by disc brake pads and, thus, not be a true measure of wear on the rotor. The previous tool has a further disadvantage in that it is generally usable on a limited number of brake assemblies by certain manufacturers because a reference surface used for measurement is machined on the brake caliper or carrier. The previous tools may also not be able to measure both disc brake pads with the tire and wheel assembly mounted on the axle. The previous tool further requires one mechanism to measure a rotor and at least one other mechanism to measure brake pads.

The drawbacks, limitations and disadvantages associated with previously known tools for measuring disc brake component wear make it desirable to improve tools and methods for measuring rotor and brake pad thicknesses. Further, there is generally a limited availability of qualified technicians within a service facility, so anything that can simplify and speed up inspection of brake components is highly desirable. Thus, there is a need for a single tool and method capable of accurately and precisely measuring the thickness of a rotor wear area and of both disc brake pads with the tire and wheel assembly mounted on an axle end of a heavy-duty vehicle regardless of the manufacturer of the brake assembly.

SUMMARY

A summary is provided to introduce concepts that are presented in the description. This summary is not intended to identify key factors or essential features of the disclosed subject matter, nor is it intended to limit the scope of the disclosed subject matter. The drawback, limitations and disadvantages associated with previously known tools and methods are overcome with the tool and method according to aspects of the disclosed subject matter. Specifically, the tool and method according to aspects of the disclosed subject matter provide a single tool for quick, accurate and precise measurements of the thickness of a rotor wear area and of both disc brake pads. Further, the tool and method can be utilized with the tire and wheel assembly mounted to an axle end of a heavy-duty vehicle and regardless of the manufacturer of the brake assembly thereby minimizing inspection time.

According to one aspect, a tool for measuring dimensions of disc brake components has an elongated first member. The elongated first member has a first tip extending transversely from the first member. The first tip has a first projection at an end portion of the first tip. An elongated second member engages and is relatively movable to the first member. The second member has a second tip extending transversely from the second member in the same direction as the first tip of the first member. The second tip has a second projection at an end portion of the second tip. The first and second members have first indicia that indicates the relative distance between surfaces of the first and second projections when measuring an object located between the first and second projections, such as a disc brake rotor. The first and second members have second indicia that indicates the relative distance between surfaces of the first and second tips when measuring spaced apart objects located outside of the first and second tips, such as a disc brake pad.

The tool is particularly suitable for use with air disc brake assemblies for heavy-duty vehicles. The tool is capable of measuring disc brake components without removing a wheel associated with the disc brake to be measured. The object located between the first and second projections is a rotor with an unworn ridge area at its radially outer edge of a first dimension. The first and second projections each extend a distance greater than the first dimension. The first and second projections extend in respective directions toward one another when measuring a thickness of a rotor. The first and second projections extend in respective directions away from one another when measuring a thickness of a brake pad. The first and second indicia are graduated and located on opposite sides of a slot in the first member.

The tool may include structure located at the transverse edges of the first and second members to secure the first and second members together and allow relative movement in a direction along the longitudinal extents of the first and second members. The structure comprises retention tabs. The tabs are formed about transverse edges of the other of the first and second members. The tool may also include a bent end portion on at least one of the first and second members for manual engagement to relatively move the first and second members. The thickness of each of the first and second tips is sized to fit between a rotor and a brake pad.

According to another aspect, a method of measuring dimensions of components in a heavy-duty vehicle air disc brake assembly without requiring removal of a wheel from the associated air disc brake assembly is made possible. The measuring is accomplished with a tool having relatively movable first and second members with respective first and second indicia to indicate the relative distance between portions of the first and second members. The method includes inserting the portions of the first and second members into an access area of the disc brake system. Portions of the first and second members are moved relative to one another so surfaces of the first and second portions are spaced apart. The portions of the first and second members are then moved relative to one another so the surfaces of the portions engage surfaces of the air disc brake assembly to be measured. The dimension of the component of the air disc brake assembly is then read directly from one of the first and second indicia.

The method includes measuring a thickness of a disc brake rotor by moving the first and second members relative to one another so surfaces of the portions are spaced apart a distance greater than the thickness of the disc brake rotor to be measured. The first and second members are then moved so the surfaces of the portions engage opposite facing surfaces of the rotor. The thickness of the rotor is read from graduated markings of the first indicia. The surfaces of the portions are defined by projections extending in respective directions toward one another.

The method includes measuring an approximate thickness of a disc brake pad by moving the disc brake pad proximate the rotor. The members are moved relative to one another so the surfaces of the first and second portions are spaced apart a distance less than the thickness of the disc brake pad to be measured. The first and second members are then moved so the portions of the first and second members respectively engage a surface of the rotor and a reference surface of a disc brake pad to be measured. The approximate thickness of the brake pad is read from graduated markings of the second indicia. The surfaces of the portions are defined by tips with surfaces facing in respective directions away from one another.

DRAWINGS

The description and drawings set forth certain illustrative aspects and implementations of the disclosed subject matter. These are indicative of but a few of the various ways in which one or more aspects and implementations may be employed. Further features will become apparent from reading the following description with reference to the accompanying drawings, in which:

FIG. 1 is a plan view of a tool for measuring dimensions of brake components, according to one aspect;

FIG. 2 is a top view of the tool illustrated in FIG. 1, taken approximately along the line 2-2 of FIG. 1;

FIG. 3 is an enlarged view of an end portion of the tool illustrated in FIG. 1 and a portion of a disc brake rotor with an unworn ridge area;

FIGS. 9-11 are views, similar to FIG. 8, with parts of the tool in different relative positions;

FIG. 13 is a top view of the tool illustrated in FIG. 12, taken approximately along the line 13-13 of FIG. 12;

FIG. 14 is an enlarged view of an end portion of the tool illustrated in FIG. 13, outlined approximately along the dashed ellipse 14 in FIG. 13, illustrating manually engageable bent end portions;

DESCRIPTION

Figure 4:
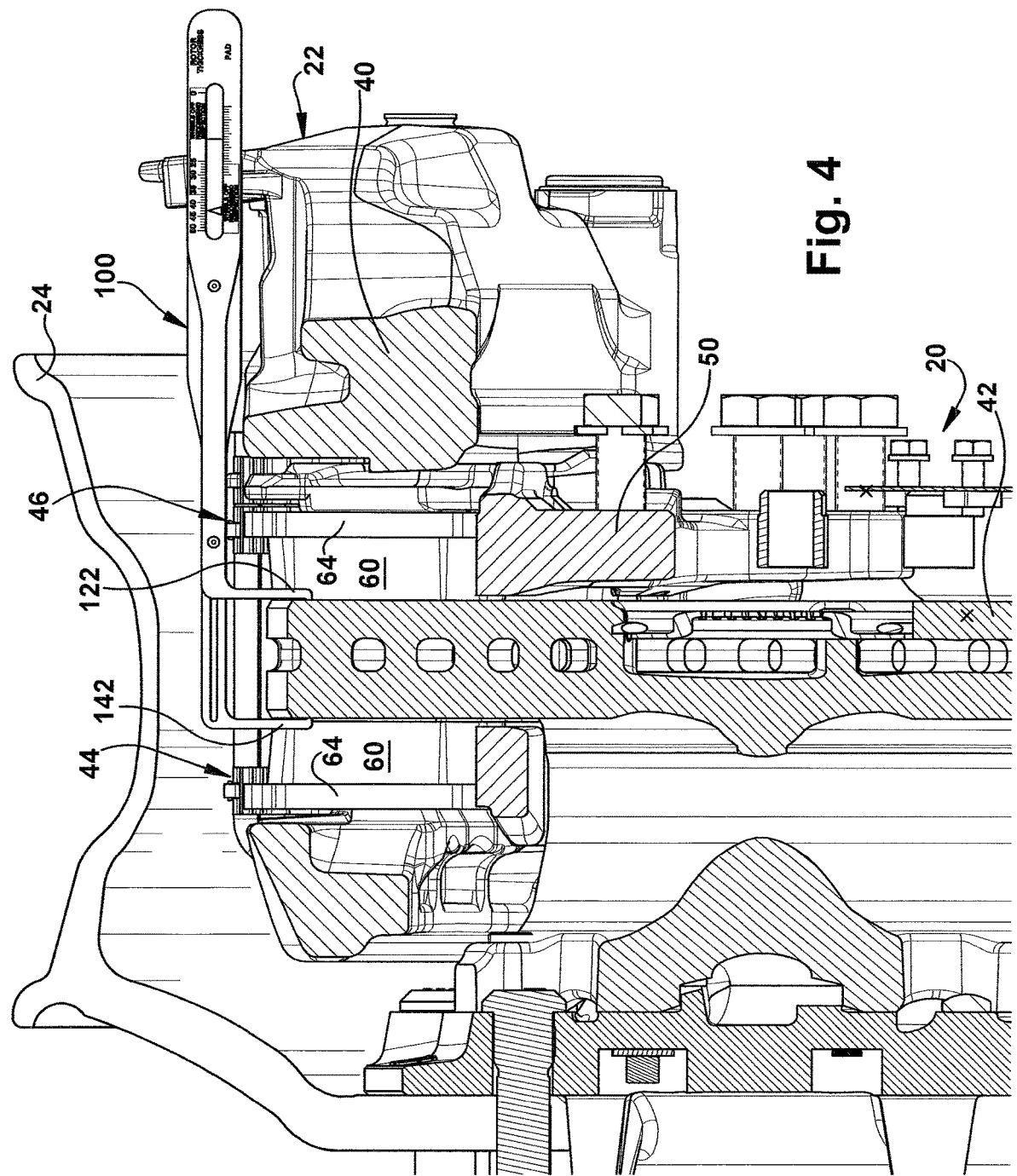
FIG. 4 is a view, partly in section, illustrating the tool of FIG. 1 measuring a thickness of a disc brake rotor.

The disclosed subject matter is described with reference to the drawings, in which like reference numerals are used to refer to like elements throughout the description. In the description, for purposes of explanation, numerous specific details are set forth in order to provide an understanding of the disclosed subject matter. It will be understood, however, that the disclosed subject matter may be practiced and implemented without these specific details.

Heavy-duty vehicles typically include trucks, tractors and trailers. The heavy-duty vehicles include an axle/suspension system (not shown) with at least one transversely extending axle (not shown) and wheel end assembly 20 (FIG. 4), as is known. A brake system, such as an air disc brake system, is mounted on the axle and wheel end assembly 20, as is known. The air disc brake system typically has a disc brake assembly 22 mounted on a respective end of the axle and wheel end assembly 20.

The heavy-duty vehicle also has multiple tire and wheel assemblies 24 (only showing a rim or wheel in FIG. 4). Each tire and wheel assembly 24 is mounted on a respective end of an axle and wheel end assembly 20. The tire and wheel assembly 24 typically surrounds the disc brake assembly 22 and, thereby, limits or prevents access to the disc brake assembly for inspection and servicing.

Figure 5:
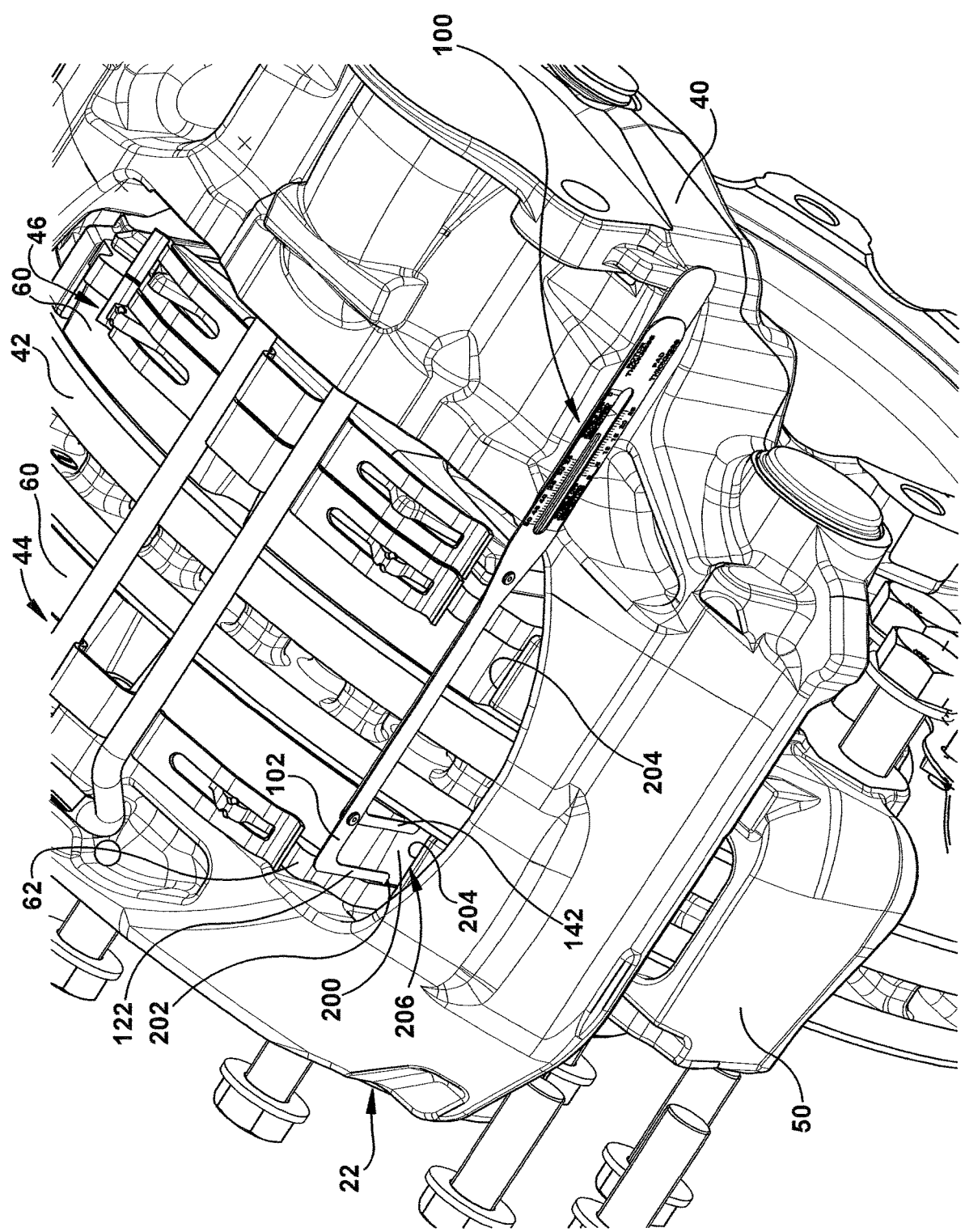
FIG. 5 is a perspective view illustrating the tool measuring a thickness of an outboard disc brake pad.
Figure 6:
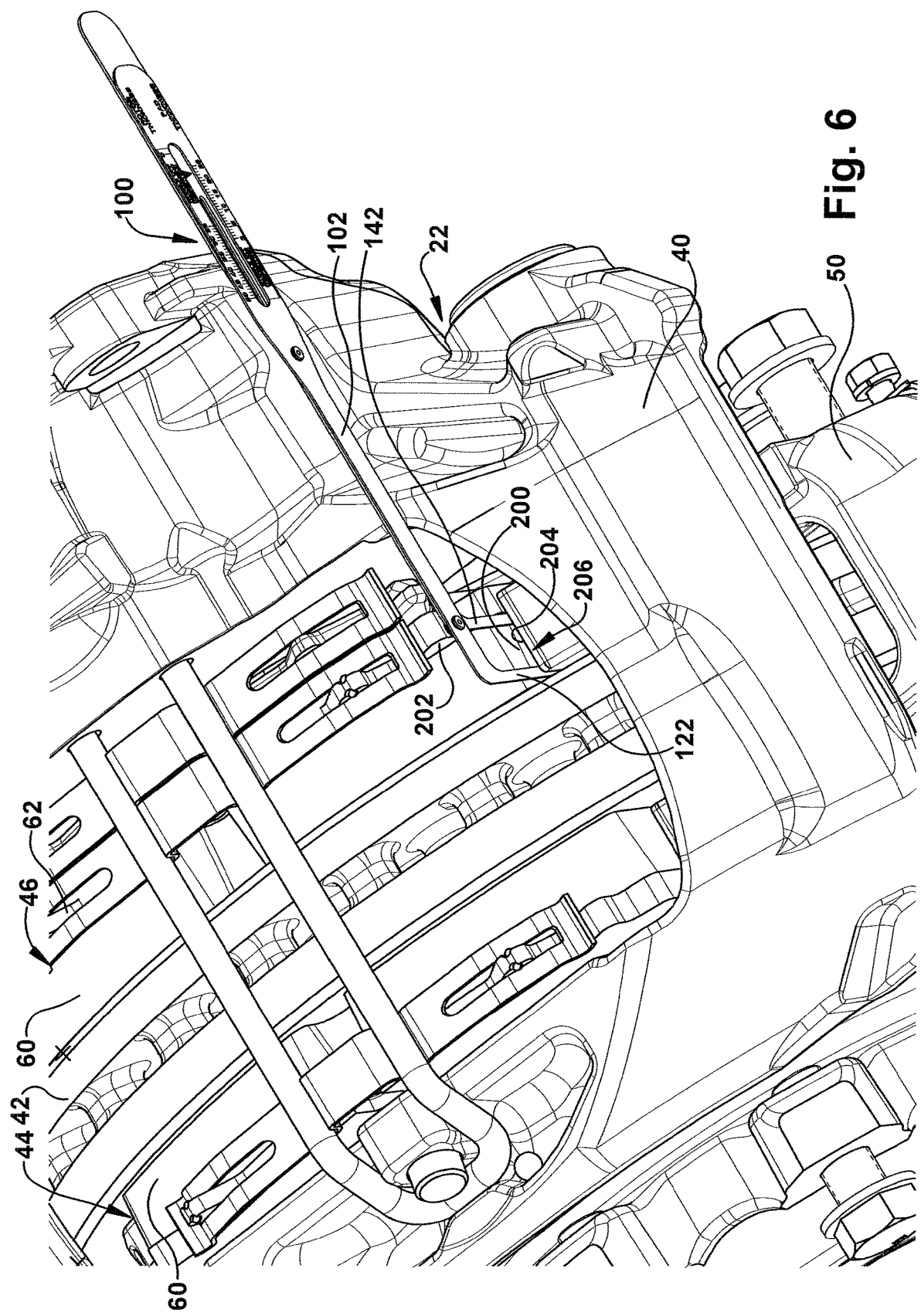
FIG. 6 is a perspective view illustrating the tool measuring a thickness of an inboard disc brake pad.
Figure 7:
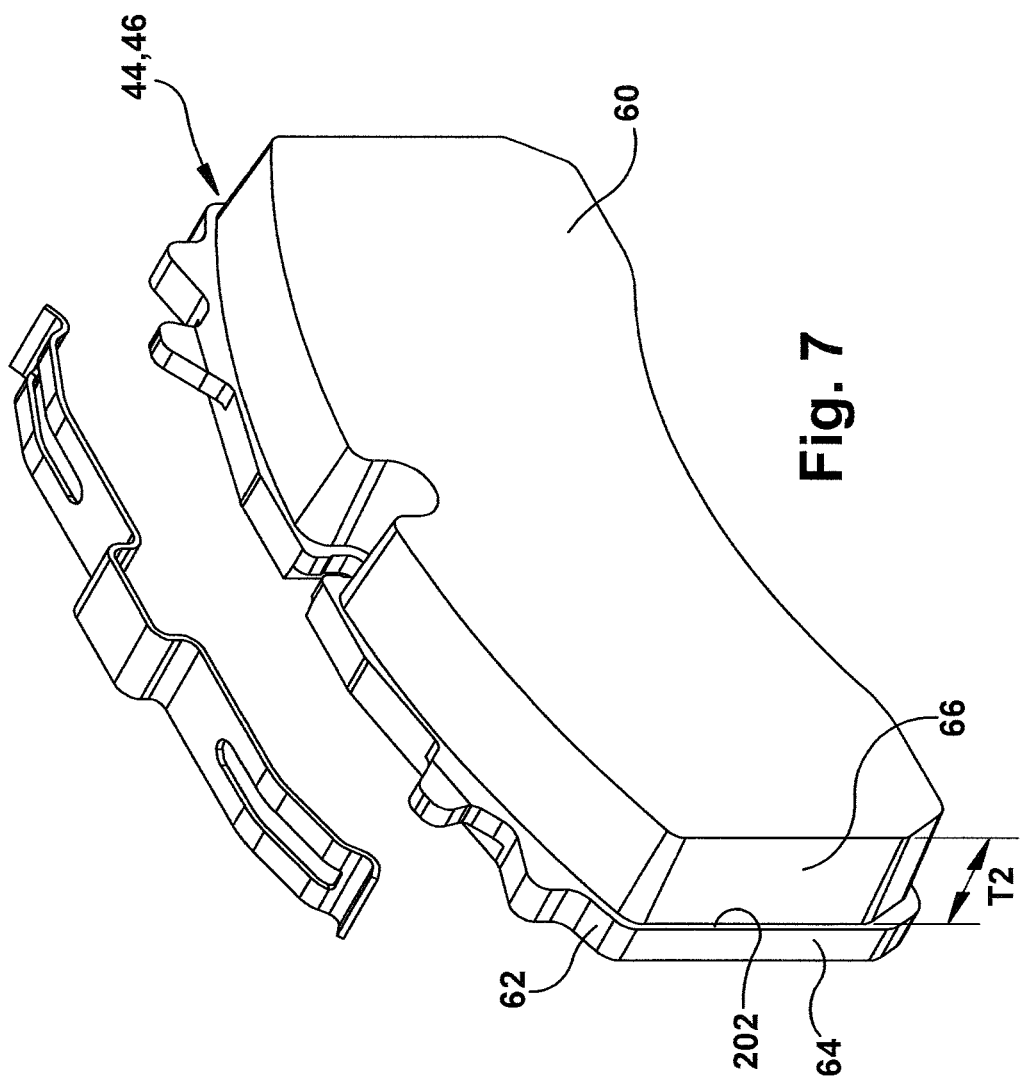
FIG. 7 is an enlarged perspective view of a representative disc brake pad showing a void space and a reference surface.

The disc brake assembly 22 includes a carrier 50, a rotor 42, a pair of disc brake pads 44, 46 (FIGS. 5-6) and an actuator (not shown) which are supported by a caliper 40. The disc brake assembly 22 is illustrated in FIG. 5-6 with the tire and wheel assembly 24 removed for clarity. Each of the disc brake pads 44, 46 have friction material 60 attached to a backing plate 62 (FIG. 7). The friction material 60 may be molded, adhesively bonded or mechanically fixed to the backing plate 62. The backing plate 62 has an engagement surface 64 that contacts a surface of a component, such as the carrier 50, to limit or stop rotational movement of the respective disc brake pads 44, 46. The friction material 60 has an end surface 66 that typically does not extend as far as the extent of the engagement surface 64 of the backing plate 62 by about 1.5 mm to 2.0 mm. A relatively thin gap or void space 200 (FIGS. 5-6) of a few millimeters is, thus, created between the end surface 66 of the friction material 60 and the carrier 50. Portions of the tool 100 may fit into the void space 200 to measure thickness T2 of the friction material 60 on a disc brake pad 44, 46. The backing plate 62 also has a reference surface 202 that can be engaged by a portion of the tool 100 to measure thickness T2 of the friction material on a disc brake pad 44, 46.

The rotor 42 and friction material 60 of the disc brake pads 44, 46 are subject to wear during the operation of the heavy-duty vehicle. Vehicle operators, fleet owners, service technicians and enforcement agencies periodically inspect and measure a thickness T1 (FIG. 3) of the rotor 42 and the thickness T2 of each of the disc brake pads 44, 46. The thickness measurements are used to compare the thicknesses of these components with recommended Out-Of-Service limits established by agencies, such as the Commercial Vehicle Safety Alliance (CVSA).

For example, a new rotor 42 may have a starting thickness T1 of about 45 mm and a minimum service limit thickness in the range of about 37 mm to about 38 mm. The dimensions of each of the disc brake pads 44, 46 may vary depending on the particular manufacturer and material used. By way of example, the starting thickness T2 of the friction material 60 of a new or remanufactured heavy-duty vehicle disc brake pad 44, 46 may be in the range of about 20 mm to about 24 mm. The thickness of the backing plate 62 may be in the range of about 7 mm to about 9 mm. Depending on the material and the manufacturer, the minimum service limit thickness T2 for the friction material 60 of the disc brake pads 44, 46 may typically be about 2 mm. Because of the time that may lapse between service visits and work that the heavy-duty vehicle performs, it may be desirable to replace the wearable components before they reach the respective recommended minimum thicknesses T1, T2.

Obtaining meaningful measurements of the thicknesses T1, T2 of the rotor 42 and the disc brake pads 44, 46 is often difficult and time consuming due to the relatively limited access to these components when a tire and wheel assembly 24 is mounted on the axle and wheel end assembly 20 that carries the disc brake assembly 22. It is often then necessary to remove the tire and wheel assembly 24 from the axle end to gain access to the rotor and disc brake pads. This is generally a labor intensive and time consuming procedure that takes up service technician time and removes the heavy-duty vehicle from service.

An improved tool 100 (FIGS. 1-2) and method of using the tool are provided according to aspects of this disclosure. The tool 100 and method of using the tool overcome the drawbacks, limitations and disadvantages of the previously known measuring tools. The tool 100 and method can quickly yield meaningful measurements of the thickness T1 of a wear area W (FIG. 3) of the rotor 42 and the thickness T2 (FIG. 7) of each disc brake pad 44, 46. These measurements can be accomplished with the tire and wheel assembly 24 mounted to an axle and wheel end assembly 20 of a heavy-duty vehicle and regardless of the manufacturer of the disc brake assembly 22.

The wear area W (FIG. 3) of the rotor 42 develops with use as a region of reduced thickness T1 due to engagement by the friction material 60 of the respective disc brake pads 44, 46 against the rotor. The rotor 42 may have a ridge R formed on each side of the rotor 42 at the radial outer edge that results from not being engaged by the friction material 60 of the disc brake pads 44, 46. These ridges R can lead to incorrect measurement of the thickness T1 of the rotor 42 with prior art tools and techniques because they are not subject to wear and can be misleading if a thickness is measured across the ridges. It should be apparent that the ridges R may not be the same size.

According to one aspect, the tool 100 for measuring certain dimensions of disc brake components is provided. The tool 100 is particularly suitable for use with air disc brake assemblies 22 for heavy-duty vehicles without requiring removal of the tire and wheel assemblies 24. The overall length of the tool 100 may be any suitable length that is long enough to reach into a dual tire system and short enough to clear hardware located outside of the disc brake assembly 22, for example about 215 mm long. The tool 100 has an elongated first member 102 (FIG. 1) and an elongated second member 104. The first and second members 102, 104 are sized such that they are narrow enough to fit into access areas of the disc brake assembly 22. The first and second members 102, 104 are also thin enough to fit into the void space 200 (FIGS. 5-6) between the molded end surface 66 of the friction material 60 of the disc brake pads 44, 46 and a carrier engagement surface 204 that partially defines a pad support slot 206. The tool 100 has a relatively larger handling section 110 that is use to hold and manipulate the tool. The respective widths of the first and second members 102, 104, taken in a direction perpendicular to the longitudinal extent of the tool 100, are also large enough to provide mechanical strength to the tool 100 and sufficient area in the handling section to manually manipulate. It is desirable for the tool 100 to be somewhat flexible if needed so it can be bent slightly to avoid interference with components mounted on or near the wheel end assembly 20.

The elongated second member 104 (FIGS. 1-2) is relatively movable to the first member 102. The second member 104 has at least one slot 106 extending longitudinally for a portion of the entire length of the second member. The elongated second member 104 is slidably or linearly movable relative to the first member 102. The tool 100 is preferably corrosion resistant and is made from a suitable material such as molded plastic or a metal, for example a 24 gauge 304 stainless steel. The tool 100 is relatively thin so that the first and second members 102, 104 can fit into the void space 200 in the disc brake assembly 22 without dismantling any part of the axle and wheel end assembly 20 or dismounting the tire and wheel assembly 24. The thicknesses of the first and second members 102, 104 preferably are about 1.5 mm or less in the area that must fit into the void space 200 of the disc brake assembly 22. The void space 200 is between the end surface 66 of the friction material 60 of the disc brake pads 44, 46 and the carrier engagement surface 204 (FIGS. 5-6). An access area 206 is formed in the disc brake assembly 22 for the tool 100 to fit into.

The first member 102 overlays and engages the second member 104. Connection devices 108 extend through a pair of openings (not shown) in the first member 102 and through the slot 106 of the second member 104. The connection devices 108 enable relative sliding movement between the first and second members 102, 104. The connection devices 108 maintain the first and second members 102, 104 aligned longitudinally and prevent relative movement in a direction perpendicular to the longitudinal extent of the members. The connection devices 108 may be any suitable structure and material, such as metal rivets, nylon buttons, fasteners and the like. The connection devices 108 hold the first and second members 102, 104 together and optionally provide a predetermined amount of friction therebetween so the first and second members can maintain a relative position if desired. Alternatively, the tool 100 may have a portion, such as the handling section 110, that is large enough in area that the first and second members 102, 104 can be squeezed or pinched together with fingers on one hand and removed from within the disc brake assembly 22 to visually read first or rotor indicia 160 and/or second or pad indicia 180. The back side 112 of the second member 104 may have at least a portion that can be touched by an operator and include a non-slip surface feature, such a spray coating or knurling. An optional threaded thumb wheel (not shown) may be incorporated into the tool 100, either to lock the first and second members 102, 104 together in a fixed position when tightened or when loose allow relative movement of the first and second members.

The elongated first member 102 has a first tip 122 extending transversely from the first member for a distance suitable for effectively measuring a desired component of the disc brake assembly 22, such as about 25 mm or more. The first tip 122 has a first projection 124 (FIG. 3) at an end portion of the first tip. The first projection 124 extends away from the first tip 122 for about 0.5 mm to 1.0 mm. The first projection 124 has a surface 126 that can engage the wear surface W of the rotor 42 in order to accurately measure the thickness T1 of the rotor. The distance that the first projection 124 extends away from the first tip 122 is typically greater than the distance that the ridge R would extend axially outward from the rotor 42. Therefore, the ridge R does not interfere, or only minimally interferes, with the measurement of the thickness T1 of the wear area W of the rotor 42.

The elongated second member 104 has a second tip 142 extending transversely from the second member for about the same distance that the first tip 122 extends, such as about 25 mm or more, in the same direction that the first tip extends. The second tip 142 has a second projection 144 at an end portion of the second tip. The second projection 144 extends away from the second tip 142 for about 0.5 mm to 1.0 mm in a direction opposite the first projection 124, as viewed in FIG. 3. The second projection 144 has a surface 146 that is engageable with the opposite wear surface W of the rotor 42 in order to measure the functional thickness T1 of the rotor. The distance that the second projection 144 extends away from the second tip 142 is typically greater than the distance that the ridge R extends axially outward from the rotor 42. Therefore, the ridge R does not interfere, or only minimally interferes, with the measurement of the thickness T1 of the wear area W of the rotor 42.

To give the tool 100 some structure that resists breaking, the first and second tips 122, 142 are about 4 mm wide, taken in a direction substantially parallel to the longitudinal extent of the tool. If the first and second tips 122, 142 overlap to yield a total width of 4 mm, they would not fit down between the rotor 42 and the backing plate 62 if the rotor and/or disc brake pads 44, 46 are very worn (near or below recommended service limits, such as 2 mm for the disc brake pads). This would be a signal to remove the tire and wheel assembly 24 and that the disc brake pads 44, 46 should be further inspected and serviced or likely replaced.

The first or rotor indicia 160 are provided on the first and second members 102, 104. The rotor indicia 160 has graduated markings on the first member 102 to indicate the relative distance between the first and second projections 124, 144. By way of example, the rotor indicia 160 includes a graduated rotor rule portion 162 formed by suitable means, such as embossing, printing or laser etching, on a portion of the first member 102 located opposite the first tip 122. The graduated rotor rule portion 162 on the first member 102 has markings located along a window 170. The markings are calibrated to indicate the relative distance between the surfaces 126, 146 of the respective first and second projections 124, 144 when measuring an object or component located between the first and second projections, such as a rotor 42.

The rotor indicia 160 also includes an indicator or rotor rule pointer 164 formed on a portion of the second member 104 that is visible in the window 170 of the first member 102. Specifically, the rotor rule pointer 164 is formed on, and movable with, the second member 104 to point to a marking of the rotor rule portion 162. The marking pointed to is indicative of the relative distance between the first and second projections 124, 144 as a function of the relative linear position of the first and second members 102, 104.

The rotor indicia 160 may also include a rotor alert area 166 formed adjacent the window 170 of the first member 102 that can visually lead an operator or service technician to a quick conclusion that further investigation of the thickness T1 of the rotor 42 is required. The alert area 166 can be highlighted in a different color or different finish. If the rotor rule pointer 164 falls within the rotor alert area 166, the measurement of the rotor 42 has fallen below a recommended thickness T1, for example 37 mm as illustrated in FIG. 1. The rotor indicia 160 is used, for example, when measuring an object, such as the rotor 42, that is located between the first and second projections 124, 144.

Second or pad indicia 180 are provided on the first and second members 102, 104. The pad indicia 180 is graduated to indicate the relative distance between the first and second projections 124, 144. By way of example, the pad indicia 180 includes a pad rule portion 182 formed by suitable means, such as embossing, printing or laser etching, onto an end portion of the first member 102. The pad indicia 180 includes a graduated pad rule portion 182 on the first member 102 that has markings calibrated to indicate the relative distance between the first and second projections 124, 144 when measuring spaced apart objects located outside of the first and second projections.

The pad indicia 180 also includes an indicator or pad rule pointer 184 formed on an end portion of the second member 104 that is visible in the window 170 of the first member 102. Specifically, the pad rule pointer 184 is formed on, and movable with, the second member 104 to point to a marking of the pad rule portion 182. The marking is indicative of the relative distance between the surfaces 126, 146 of the first and second projections 124,144 as a function of the relative linear position of the first and second members 102, 104.

The pad indicia 180 may also include a pad alert area 186 formed adjacent the window 170 of the first member 102 that can visually lead an operator or service technician to a quick conclusion that further investigation of the thickness T2 of the friction material 60 on a disc brake pad 44, 46 is required. The pad alert area 186 can be highlighted in a different color or different finish. If the pad rule pointer 184 falls within the pad alert area 186, the measurement of the disc brake pad 44, 46 has fallen below a recommended minimum thickness, for example below 4 mm, and a "wheels off inspection" is advised.

The pad indicia 180 is used, for example, when measuring spaced apart objects located outside of the first and second projections 124, 144. For example, in order to measure an object, such as the thickness T2 of the outboard disc brake pad 44 as illustrated in FIG. 5, an inspector would move the outboard disc brake pad against, or as near as possible to, the rotor 42. The tips 122 and 142 are moved into the void space 200. The surface 146 on the second projection 144 is moved to engage the rotor 42. The surface 126 on the first projection 124 is moved to engage any suitable reference surface, such as the reference surface 202, of the backing plate 62 of the outboard disc brake pad 44. The thickness of T2 of the outboard disc brake pad 44 can then be read from the pad indicia 180.

In order to measure an object, such as the thickness T2 of the inboard brake pad 46 as illustrated in FIG. 6, an inspector would move the inboard disc brake pad against, or as near as possible to, the rotor 42. The tips 122 and 142 are moved into the void space 200. The surface 126 on the first projection 124 is moved to engage the rotor 42. The surface 146 on the second tip 142 of the second projection 144 is moved against any suitable reference surface, such as the reference surface 202 of the backing plate 62 of the inboard disc brake pad 46. The thickness T2 of the inboard disc brake pad 46 can then be read from the pad indicia 180.

The rotor indicia 160 and pad indicia 180 are preferably separate from one another, but it is contemplated that the pad and rotor indicia could be combined. The rotor and pad indicia 160, 180 each have portions on each of the first and second members 102, 104.

The tool 100 allows for meaningful measurement of the thickness T1 of the rotor 42 between the wear areas W and of both disc brake pads 44, 46 in a relatively short amount of time with the tire and wheel assembly 24 installed. Thus, the tool 100 overcomes disadvantages, limitations and drawbacks associated with the previously known brake component measuring tools. The tool 100 is not intended to be a high precision measuring instrument. The tool 100 is intended to be a quick but accurate and precise inspection measurement tool to see how close the parts are to the recommended wear out limits for a particular rotor 42 and disc brake pads 44, 46. This tool 100 could be used on a rotor 42 with different starting thickness and different final wear out thickness limits. Some rotors start at about 45 mm thick and have a wear out limit at about 37 mm or about 38 mm. The wear out limit for a particular rotor 42 is typically cast or formed into the rotor and/or stamped on the outside diameter of the rotor.

With a single tool 100, one is able to measure the thickness T2 of the outboard disc pad 44, the thickness T2 of the inboard brake pad 46 and the thickness T1 of the rotor 42. The measurements are sufficiently accurate enough to make a decision as to if and/or when to dismount the tire and wheel assembly 24 and do a closer inspection or replace parts before they are worn to an extent where they could suffer or cause damage. The versatility of the tool 100 allows it to be used to measure all of the thicknesses T1, T2 of the major wear components of the disc brake assembly 22 without having to remove the tool from the disc brake assembly. The tool 100 is relatively small, lightweight and easily deployable in a shop or in the field.

According to another aspect, a method of measuring dimensions of components in a heavy-duty vehicle air disc brake system without requiring removal of a tire and wheel assembly 24 from an associated air disc brake assembly 22 is disclosed. The method uses the tool 100 that has the elongated first member 102 with a first tip 122 at an end portion of the first member. The first tip 122 extends in a direction transversely from, and preferably perpendicular to, the elongated first member 102. The first tip 122 has a first projection 124 at an end portion of the first tip. The first projection 124 has a surface 126 that is intended to engage or contact a component that is to be measured or a reference surface of a brake component that is to be measured.

The tool 100 used in the disclosed method also has an elongated second member 104 that engages, supports, and is relatively movable to, the first member 102. The second member 104 has a second tip 142 at an end portion of the second member that extends transversely from, and preferably perpendicular to, the second member in the same direction as the first tip 122 of the first member 102. The second tip 142 has a second projection 144 located at an end portion of the second tip that extends in a direction opposite to that of the first projection 124. The second projection 142 has a surface 146 that is intended to engage or contact a component that is to be measured or a reference surface of the component that is to be measured.

The tool 100 used in the method has rotor indicia 160 formed on the first and second members 102, 104. The rotor indicia 160 includes a graduated rotor rule portion 162 on the first member 102 that has markings calibrated to indicate the relative distance between the surfaces 126, 146 of the respective first and second projections 124, 144 when measuring an object or component located between the first and second projections. The rotor indicia 160 also includes an indicator or rotor rule pointer 164 formed on, and movable with, the second member 104 to indicate the relative distance between the surfaces 126, 146 of the respective first and second projections 124, 144.

The tool 100 used in the method also has pad indicia 180 formed on the first and second members 102, 104. The pad indicia 180 includes graduated pad rule portion 182 on the first member 102 that has markings calibrated to indicate the relative distance between the first and second projections 124, 144 when measuring spaced apart objects located outside of the first and second projections. The pad indicia 180 also includes an indicator or pad rule pointer 184 formed on and movable with the second member 104 to indicate the relative distance between the first and second projections 124, 144.

To measure the thickness T1 of the disc brake rotor 42 with the tire and wheel assembly 24 mounted, the ends of the first and second members 102, 104 of the tool 100 having the tips 122, 142 are inserted within the tire and wheel assembly 24 and into any suitable access area in the disc brake assembly 22 (FIG. 4). It should be apparent that the rotor 42 can be easily accessed from a number of locations and such access may be used if only rotor thickness T1 is to be measured. The first and second members 102, 104 are moved relative to one another so the surfaces 126, 146 of the first and second projections 124, 144 are spaced apart and face one another. The spacing between the surfaces 126, 146 of the first and second projections 124, 144 must be slightly greater than the thickness of the rotor 42 taken across the unworn area of the ridges R. The first and second projections 124, 144 clear any ridge R that may be formed on either side of the rotor 42. The first and second members 102, 104 are then moved relative to one another so the surfaces 126, 146 of the first and second projections 124, 144 engage opposite sides of the rotor 42 in the wear area W. The thickness T1 of the rotor 42 can then be read directly from the rotor rule pointer 164 on the second member 104 pointing at a specific calibrated marking of the graduated rotor rule portion 162 on the first member 102.

To measure an approximate thickness T2 of the friction material 60 of one of the disc brake pads 44, 46, it is preferred that the disc brake pad to be measured engages, or at least is moved to a location near, the rotor 42. The ends of the first and second members 102, 104 of the tool 100 having the tips 122, 142 are inserted within the tire and wheel assembly 24 and into an inspection port or access area in a component of the brake assembly 22. The first and second members 102, 104 are moved relative to one another so the surfaces 126, 146 of the first and second projections 124, 144 are spaced apart and face in a direction away from one another. The first and second members are then moved into the void space 200 (FIGS. 5-6) and the first and second projections 124, 144 engage a surface of the rotor 42 and the reference surface 202 of the backing plate 62, or some other appropriate and accessible known reference surface, of a disc brake pad 44 or 46 to be measured, as illustrated in FIGS. 5-6. The thickness T2 of the disc brake pad 44, 46 can then be read directly from the pad rule pointer 184 on the second member 104 pointed at a specific marking of the graduated pad rule portion 182 on the first member 102.

Thus, the method of using the tool 100 overcomes disadvantages, limitations and drawbacks associated with the previously known brake component measuring methods. The method of using the tool 100 provides a relatively quick and meaningful way of determining the condition of the rotor 42 and the friction material 60 on the disc brake pads 44, 46 without the labor and time consuming need to remove the tire and wheel assembly 24. The results of measuring brake components with the tool 100 provide information to decide if further inspection may be appropriate.

Accordingly, the tool 100 and method of using the tool are simple and effective and overcome disadvantages of inspecting and measuring the thickness T1, T2 of the rotor 42 and disc brake pads 44, 46 of the disc brake assembly 22 without removing tire and wheel assemblies 24. This has the advantage of taking relatively little service technician or inspector time and minimizing time that the heavy-duty vehicle is not in service.

An improved tool 400, according to another aspect of this disclosure is illustrated in FIGS. 8-11. The tool 400 is an alternate version of the tool 100 illustrated in FIGS. 1-3 and described above. The tool 400 is very similar in construction and operation to the tool 100. The description of tool 100 can equally apply to tool 400 with a few exceptions that will be described below. The tool 400 can quickly yield meaningful measurements of the thickness of a wear area of a rotor and the thickness of each disc brake pad. These measurements can be accomplished with the tire and wheel assembly mounted to an axle and wheel end assembly of a heavy-duty vehicle and regardless of the manufacturer of the brake assembly.

The tool 400 is for measuring certain dimensions of disc brake components. The tool 400 is particularly suitable for use with air disc brake assemblies for heavy-duty vehicles. The overall length of the tool 400 may be any suitable length that is long enough to reach into a dual tire system and short enough to clear hardware located outside of the brake assembly.

The tool 400 has an elongated first member 402 and an elongated second member 404. The first and second members 402, 404 are sized such that they are narrow enough to fit within access areas of a brake assembly and thin enough to fit into a void space between the molded edge of friction material of the brake pad and a carrier or caliper. The tool 400 has a relatively larger handling section 410 at one end that is used to hold and manipulate the tool. The respective widths of the first and second members 402, 404, taken in a direction perpendicular to the longitudinal extent of the tool 400, are large enough to provide mechanical strength to the tool 400. It is desirable for the tool 400 to be somewhat flexible so it can be bent slightly to avoid interference with components mounted on or near a wheel end assembly.

The elongated second member 404 engages and is relatively movable to the first member 402. The second member 404 has at least one slot 406 extending longitudinally for a portion of the length of the second member. The elongated second member 404 is slidably or linearly movable relative to the first member 402 in the longitudinal direction. The tool 400 is preferably corrosion resistant and is made from a suitable material such as molded plastic or a metal, for example a 24 gauge 304 stainless steel. The tool 400 is relatively thin so that the overlapping first and second members 402, 404 can fit into the void space in the brake assembly without dismantling any part of the axle and wheel end assembly or dismounting the tire and wheel assembly. The thickness of the first and second tips 422, 442 of the first and second members 402, 404 preferably have a combined thickness of about 1.5 mm or less in the area that can fit into the void space of the brake assembly.

The first member 402 overlays the second member 404. Connection devices 408 extend through a pair of openings (not shown) in the first member 402 and through the slot 406 of the second member. The connection devices 408 enable relative sliding movement between the first and second members 402, 404 and maintain the first and second members longitudinally aligned. The connection devices 408 may be any suitable structure and material, such as metal rivets, nylon buttons, fasteners and the like. The connection devices 408 hold the first and second members 402, 404 together and can provide a predetermined amount of friction between the first and second members to maintain a relative position if desired. An optional threaded thumb wheel (not shown) may be incorporated into the tool 400 at any suitable location, either to lock the first and second members 402, 404 together in a fixed position or to move one of the first and second members relative to the other depending on its orientation. Alternatively, the tool 400 may have a portion, such as the handling section 410, that is large enough in area that the first and second members 402, 404 can be squeezed or pinched together with fingers of one hand and removed from within the disc brake assembly and then visually read the first or rotor indicia 460 and/or second or pad indicia 480.

The elongated first member 402 has a first tip 422 extending transversely from the first member for a distance of at least about 25 mm. The first tip 422 has a first projection 424 (FIG. 8) at an end portion of the first tip. The first projection 424 extends transversely away from the first tip 422 for about 0.5 mm to about 1.0 mm. The first projection 424 has a first inner surface 426 that can engage a wear surface of the rotor in order to measure the thickness of the rotor. The distance that the first projection 424 extends away from the first tip 422 is typically greater than the distance that an unworn ridge area extends outwardly from the rotor. Therefore, the ridge area minimally, or does not, interfere with the measurement of the thickness of the rotor. The first tip 422 has a first outer surface 428 that faces in an opposite direction from first inner surface 426 and that can engage the rotor and/or a reference surface of a disc brake pad in order to measure the thickness of friction material of the brake pad.

The elongated second member 404 has a second tip 442 extending transversely from the second member for a distance of at least about 25 mm in the same direction that the first tip 422 extends. The second tip 442 has a second projection 444 at an end portion of the second tip. The second projection 444 extends away transversely from the second tip 442 for about 0.5 mm to 1.0 mm and in a direction opposite the first projection 424. The second projection 444 has a second inner surface 446 that is engageable with a wear surface of the rotor in order to measure the thickness of the rotor. The distance that the second projection 444 extends away from the second tip 442 is typically greater than the distance that the ridge area extends outwardly from the rotor. Thus, the ridge area does not interfere, or only minimally interferes, with the measurement of the thickness of the rotor. The second tip 442 has a second outer surface 448 that faces in an opposite direction from second inner surface 446 and that can engage the rotor and/or reference surface of a disc brake pad in order to measure the thickness of the friction material of the brake pad. To give the tool 400 some structure that resists breaking and/or permanent deformation, each of the first and second tips 422, 442 is about 4 mm wide, taken in a direction substantially parallel to the longitudinal extent of the tool.

Figure 8:
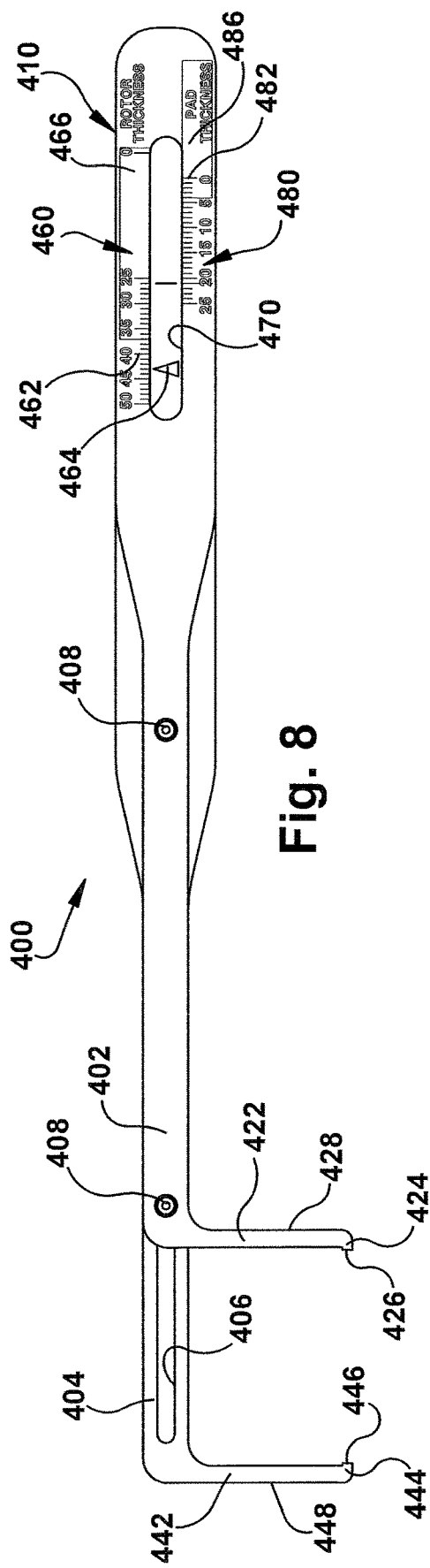
FIG. 8 is a plan view of a tool for measuring dimensions of brake components, according to another aspect.

First or rotor indicia 460 are provided on the first and second members 402, 404. The rotor indicia 460 indicates the relative distance between selected surfaces of the first and second projections 424, 444. By way of example, the rotor indicia 460 includes graduated markings or rotor rule portion 462. The markings of the rotor rule portion 462 may be formed by suitable means, such as embossing, printing or laser etching, on an end portion of the first member 402. The rotor indicia 460 also includes an indicator or rotor rule pointer 464 formed on an end portion of the second member 404 and that is visible in a window 470 in the first member 402. The rotor indicia 460 may also include an alert area 466 formed adjacent the window that can visually lead an operator or service technician to a quick conclusion that further investigation of the thickness of the rotor is recommended. For example, the alert area 466 can be highlighted in a different color or different finish to indicate that the measurement of the rotor has fallen below a recommended thickness, for example 37 mm as illustrated in FIG. 8. The rotor indicia 460 is used, for example, when measuring an object, such as the rotor, that is located between the first and second projections 424, 444 of the first and second members 402, 404.

Figure 9:
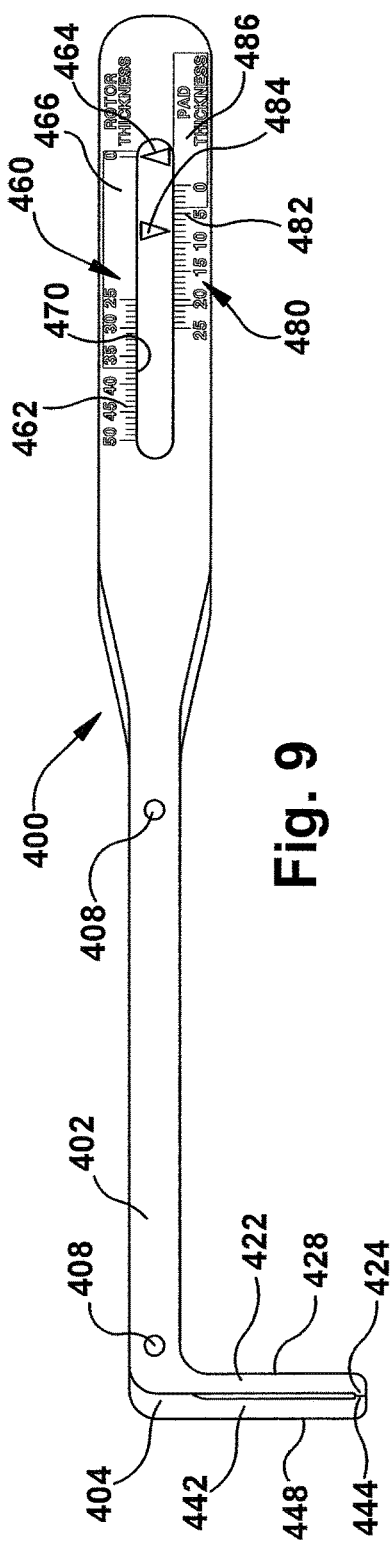

The markings on the calibrated and graduated rotor rule portion 462 correspond to the distance between the first and second inner surfaces 426, 446 of the respective first and second projections 424, 444. For example, when the first and second inner surfaces 426, 446 of the respective first and second projections 424, 444 are brought into engagement, as illustrated in FIG. 9, the rotor rule pointer 464 is located adjacent the "0" marking on the graduated rotor rule portion 462.

The rotor indicia 460 formed on the first and second members 402, 404 includes the graduated rotor rule portion 462 on the first member 402 that have markings calibrated to indicate the relative distance between the first and second inner surfaces 426, 446 of the respective first and second projections 424, 444. For example, when measuring an object or component located between the first and second projections 424, 444, such as a brake rotor, the inner surfaces 426, 446 of the respective first and second projections 424, 444 are brought into engagement with axially opposite sides of the rotor. The rotor rule pointer 464 is located adjacent to a particular number on the graduated rotor rule portion 462 on the first member 402. The markings on the graduated rotor rule portion 462 correspond to the distance between the inner surfaces 426, 446 of the respective first and second projections 424, 444 when measuring an object or component located between the first and second projections and, thus, the thickness of the object, such as a rotor. For example, when the first and second projections 424, 444 are spaced apart a distance of 50 mm, the rotor rule pointer 464 is located adjacent the "50" marking on the graduated rotor rule portion 462, as illustrated in FIG. 10.

Second or pad indicia 480 are provided on the first and second members 402, 404. The pad indicia 480 indicates the relative distance between the first and second outer surfaces 428, 448 of the respective tips 422, 442. By way of example, the pad indicia 480 includes a pad rule portion 482 formed by suitable means, such as embossing, printing or laser etching, onto handling section 410 of the first member 402. The pad indicia 480 also includes an indicator or pad rule pointer 484 formed on an end portion of the second member 404 that is visible in the window 470 in the first member 402. The pad indicia 480 may also include a pad alert area 486 formed adjacent the window 470 that can visually lead an operator or service technician to a quick conclusion that further investigation of the thickness of a brake pad is recommended. For example, the pad alert area 486 can be highlighted in a different color or different finish to indicate that the measurement of the friction material of the brake pad has fallen below a recommended minimum thickness, for example 4 mm as illustrated in FIG. 8.

The pad indicia 480 of the tool 400 has the pad rule portion 482 graduated in a reverse numerical orientation from the pad indicia 180 of the tool 100. This is because the pad indicia 480 indicates the relative distance between the first and second outer surfaces 428, 448 of the respective first and second members 402, 404. The tool 400 and pad indicia 480 may be easier to use and read in some instances than the pad indicia 180 of the tool 100.

The markings on the graduated pad rule portion 482 correspond to the distance between the outer surfaces 428, 448 of the respective first and second projections 424, 444. For example, when the first and second inner surfaces 426, 446 of the respective first and second projections 424, 444 are brought into engagement, the pad rule pointer 484 is located adjacent the "8" marking on the graduated pad rule portion 482, as illustrated in FIG. 9. This results from each of the first and second tips 422, 442 having a width at the projections 424, 444 of approximately 4 mm.

The pad indicia 480 is used, for example, when measuring spaced apart objects located outside of the first and second outer tips 422, 442. For example, in order to measure an object, such as the thickness of an inboard brake pad, an inspector would move inboard brake pad against, or as near as possible to, the rotor. The inspector would then move the second outer surface 448 on the second tip 442 against, or as close as possible to, the rotor and the first outer surface 428 on the first tip 422 against any suitable reference surface, such as the reference surface of the backing plate, of the inboard brake pad.

In order to measure an object, such as the thickness of an outboard brake pad, an inspector would move the outboard brake pad against, or as near as possible to, the rotor. The inspector would then move the first outer surface 428 on the first tip 422 against the rotor and the second outer surface 448 on the second tip 442 against any suitable reference surface, such as the reference surface of the backing plate, of the outboard brake pad. For example, when the first and second outer surfaces 428, 448 are spaced apart a distance of 25 mm, the pad rule pointer 484 is located adjacent the "25" marking on the graduated pad rule portion 482, as illustrated in FIG. 11.

The rotor and pad indicia 460, 480 are preferably separate from one another, but it is contemplated that the first and second rotor indicia could be combined into single indicia. The rotor and pad indicia 460, 480 each have portions on both of the first and second members 402, 404.

The tool 400 allows for meaningful measurement of the thickness of the rotor between the wear areas and of both disc brake pads in a relatively short amount of time with the tire and wheel assembly installed. Thus, the tool 400 overcomes disadvantages, limitations and drawbacks associated with the previously known brake component measuring tools. The tool 400 is not intended to be a high precision measuring instrument. The tool 400 is intended to be a quick but accurate and precise inspection measurement tool to see how close the brake components are to the recommended wear out limits for a particular rotor and brake pad.

With a single tool 400 one is able to measure the thickness of the outboard brake pad, the thickness of the inboard brake pad and the thickness of the rotor. These measurements are sufficient enough to make a decision as to when to dismount the tire and wheel assembly and do a closer inspection of, or replace, brake components before they are worn to an extent where they could suffer or cause damage. The tool 400 is relatively small, lightweight and easily deployable in a shop or in the field.

An improved tool 600, according to yet another aspect of the disclosed subject matter is illustrated in FIGS. 12-18. The tool 600 is an alternate structural version of the tool 100 or 400 illustrated in FIGS. 1-3 and 8-11, respectively, and described above. The tool 600 is very similar in construction and operation to the tool 100 or 400. The description of tool 100 or 400 can equally apply to tool 600 with a few exceptions that are directed to structural modifications and that will be described. The tool 600 can quickly yield meaningful measurements of disc brake components, such as the thickness of a wear area of a rotor and the thickness of each disc brake pad. These measurements can be accomplished with the tire and wheel assembly mounted on an axle and wheel end assembly of a heavy-duty vehicle and generally regardless of the manufacturer of the brake assembly.

The tool 600 is particularly suitable for use with air disc brake assemblies used on heavy-duty vehicles. The overall length of the tool 600 may be any suitable length that is long enough to reach within an inboard wheel of a dual tire system and short enough to clear hardware and/or structure located outside of the brake assembly. The tool 600 is preferably corrosion resistant and is made from a suitable material such as molded plastic or a metal, for example a 24 gauge 304 stainless steel.

The tool 600 (FIG. 12) has an elongated first member 602 and an elongated second member 604. The first and second members 602, 604 are sized such that they are narrow enough to fit within access areas of a brake assembly and thin enough to fit into a void space between a molded edge of friction material of the brake pad and a carrier or caliper. The tool 600 has a relatively larger handling section 610 at one end that is used to hold and manipulate the tool longitudinally opposite a measuring section 616 at another end.

The first and second members 602, 604 each include manually engageable bent end portions 606, 608 (best seen in FIGS. 13-14) respectively that enhance the ability of an operator to move the first and second members relative to one another. The respective widths of the first and second members 602, 604, in the handling and the measuring sections 612, 616, taken in a direction perpendicular to the longitudinal extent of the tool 600 are large enough to provide mechanical strength to the tool 600. It is desirable for the tool 600 to be somewhat flexible so it can be bent slightly to avoid or accommodate interference with components mounted on or near a wheel end assembly and/or axle end.

The elongated second member 604 engages and is relatively movable to, the first member 602. The elongated second member 604 is slidably or linearly movable relative to the first member 602 in a longitudinal direction. The first member 602 has a pair of slots 610a, 610b, each extending longitudinally for a portion of the length of the first member. The tool 600 is relatively thin so that the overlapping first and second members 602, 604 can fit into the void space in the brake assembly without dismantling any part of the axle and wheel end assembly or dismounting the tire and wheel assembly. The thickness of the first and second members 602, 604 preferably have a combined thickness T (FIG. 16) of about 1.5 mm in the area that can fit into void spaces of the brake assembly.

Figure 16:
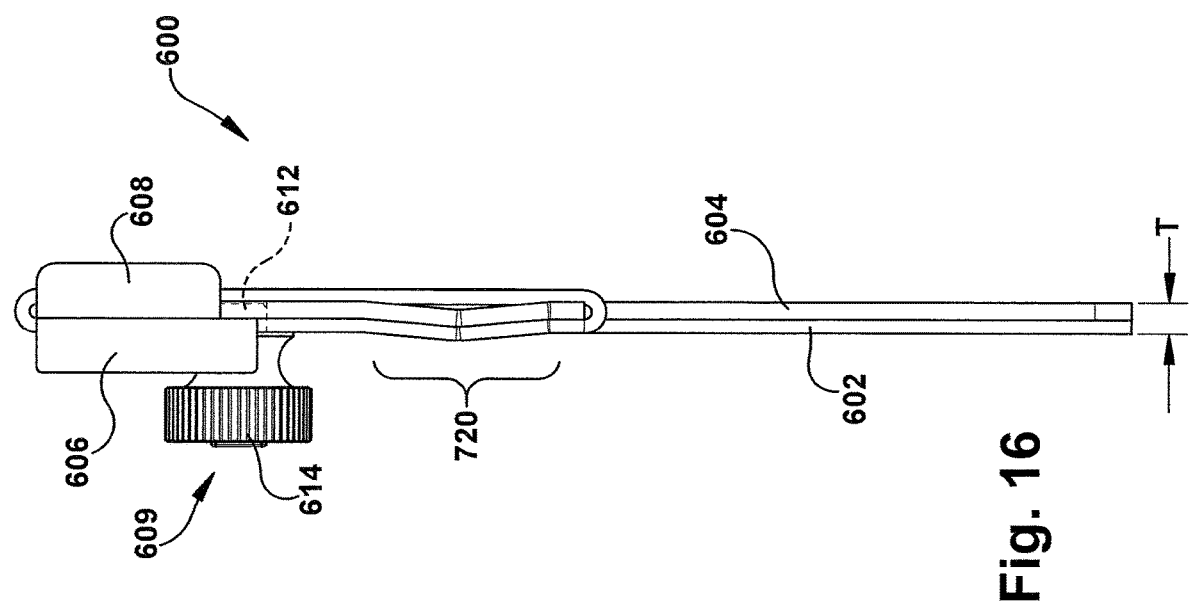
FIG. 16 is an enlarged end view of the tool illustrated in FIG. 12, taken approximately along the line 16-16 of FIG. 12.
Figure 18:
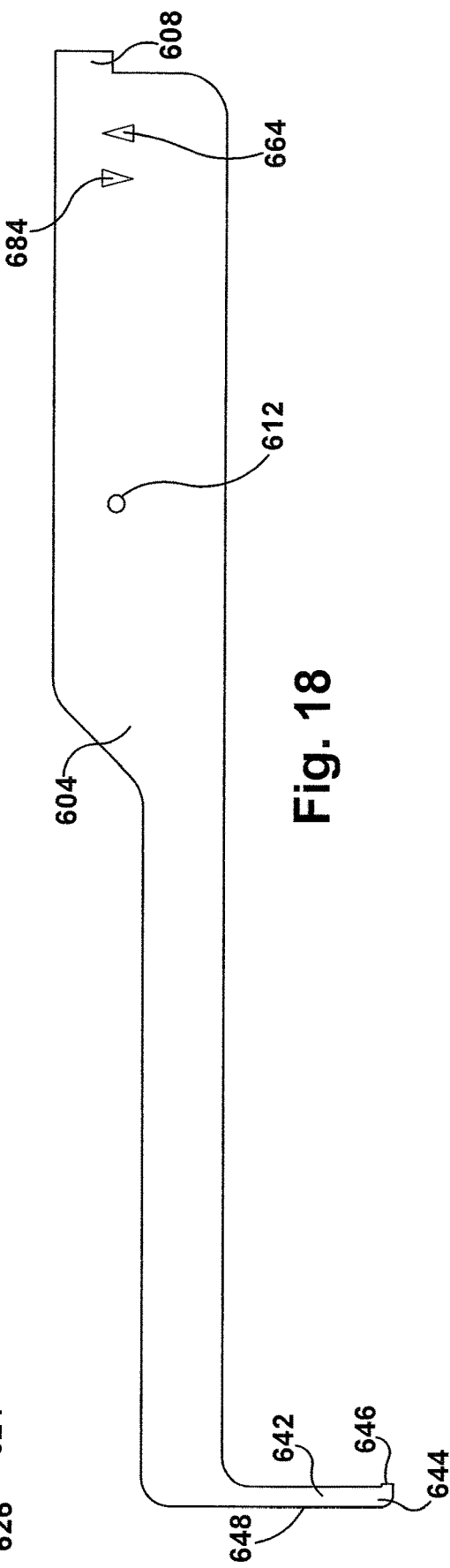
FIG. 18 is a top plan view of another member of the tool illustrated in FIG. 12 prior to assembly.

The first member 602 overlays the second member 604. A connection device 609 has an externally threaded projection 612 (FIGS. 16 and 18). The projection 612 extends through the slot 610a in the first member 602 and is threaded into structure, such as a threaded opening in the second member 604 or a member with an internal thread that is fixed to the second member or that may be separate, such as a nut. The connection device 609 may include any suitable structure and material, such as fasteners, metal rivets, nylon buttons, and the like. The connection device 609 may include a thumbwheel 614 with a knurled portion to facilitate manual rotation. The connection device 609 enables relative movement between the first and second members 602, 604 when not tightened and inhibits relative movement when tightened to clamp the first and second members together. The connection device 609 can provide a predetermined amount of friction or clamping force between the first and second members 602, 604 when tightened so the first and second members 602, 604 can maintain a relative position if desired, such as when a brake component is measured but the result is not easily visible and then read when the tool 600 is moved away from the brake assembly.

The elongated first member 602 has a first tip 622 extending transversely from the first member. The first tip 622 has a first projection 624 (FIG. 12) at an end portion of the first tip. The first projection 624 extends transversely away from the first tip 622 for a relatively short distance. The first projection 624 has an inner surface 626 extending perpendicular to the longitudinal extent of the tool 600 that can engage a wear surface of the rotor in order to measure the thickness of the rotor. The distance that the first projection 624 extends away from the first tip 622 is typically greater than the distance that an unworn ridge area extends outwardly from the rotor. Thus, the ridge area of the rotor does not interfere, or only minimally interferes, with measuring the thickness of the rotor. The first tip 622 has a first outer surface 628 that faces in an opposite direction from inner surface 626 that can engage the rotor and/or a reference surface of a disc brake pad in order to measure the thickness of the friction material of the brake pad.

The elongated second member 604 has a second tip 642 extending transversely from the second member for a distance about the same as the distance the first tip 622 extends from the first member and in the same direction as the first tip. The second tip 642 has a second projection 644 at an end portion of the second tip. The second projection 644 extends away from the second tip 642 in a direction opposite the first tip 622. The second projection 644 has an inner surface 646 extending perpendicular to the longitudinal extent of the tool 600 and that is engageable with a wear surface of the rotor in order to measure the thickness of the rotor. The distance that the second projection 644 extends away from the second tip 642 is typically greater than the distance that the ridge area extends outwardly from the rotor. Therefore, the ridge area of the rotor does not interfere, or only minimally interferes, with the measurement of the thickness of the rotor.

The second tip 642 has a second outer surface 648 that faces in an opposite direction from inner surface 646 and that can engage the rotor and/or a reference surface of a disc brake pad in order to measure the thickness of the friction material of the brake pad. Each of the first and second tips 622, 642 may be at least about 4 mm wide, taken in a direction substantially parallel to the longitudinal extent of the tool 600. These widths provide the tips 622, 642 of the tool with sufficient structure to resist breaking or deflecting an amount that might affect measurement of a brake component.

Figure 12:
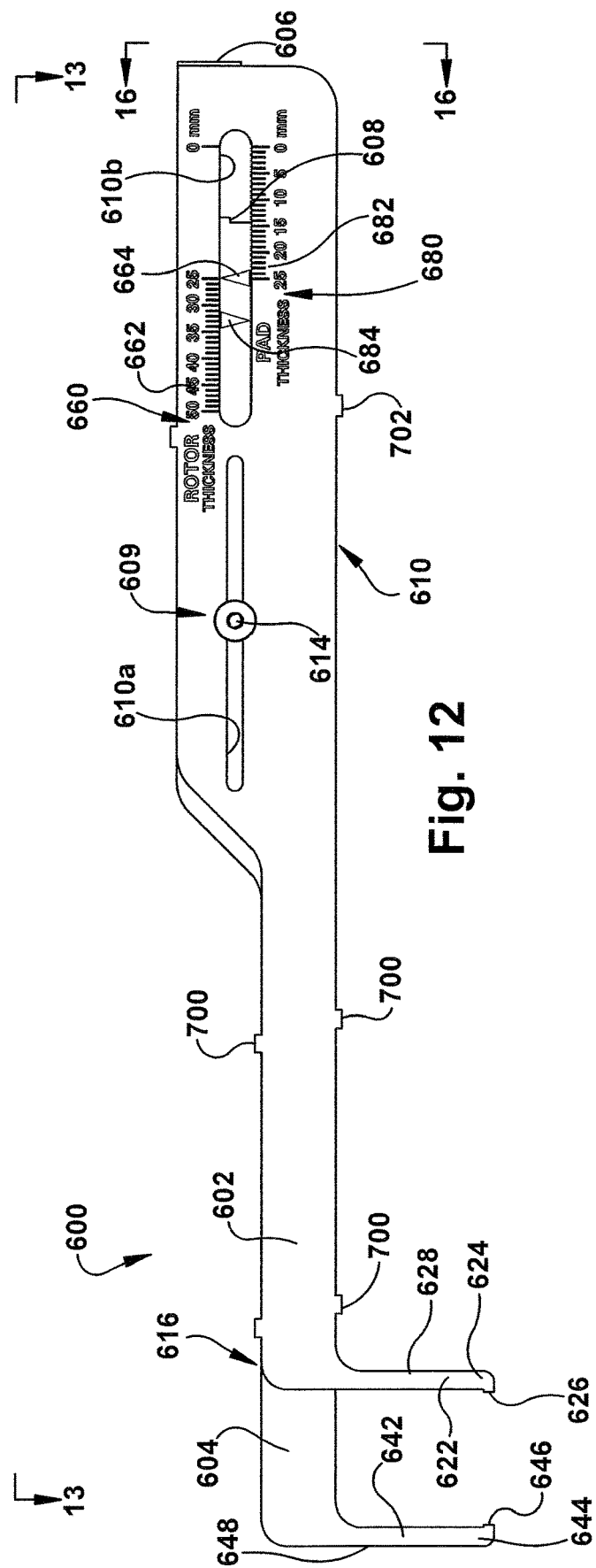
FIG. 12 is a front plan view of a tool for measuring dimensions of brake components, according to yet another aspect.
Figure 17:
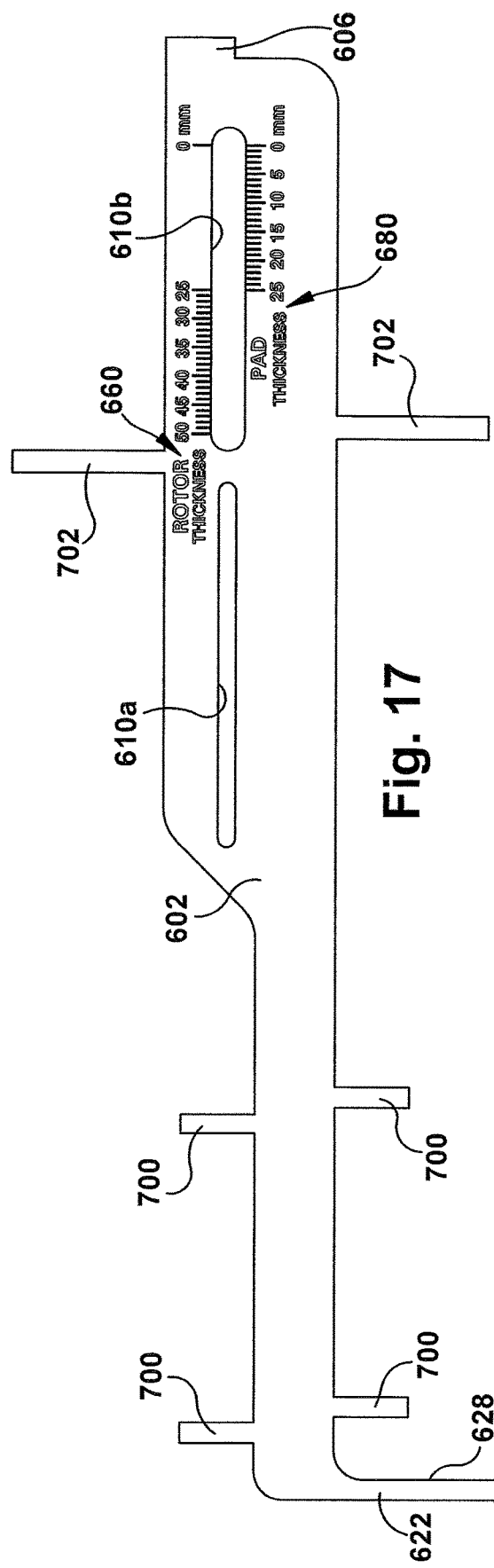
FIG. 17 is a top plan view of a member of the tool illustrated in FIG. 12 prior to assembly.

First or rotor indicia 660 are provided on the first and second members 602, 604. The rotor indicia 660 is graduated, as illustrated in FIGS. 12 and 17, to indicate a relative distance between the first and second projections 624, 644. By way of example, the rotor indicia 660 includes a graduated rotor rule portion 662 with markings with associated numbers formed by suitable means, such as embossing, printing or laser etching, in the handling section 610 of the first member 602 and within the axial extent of the slot 610b. The rotor indicia 660 also includes an indicator or rotor pointer 664 (best seen in FIG. 18) formed in the handling section 610 of the second member 604 that is visible in a window defined by the slot 610b in the first member 602. The rotor indicia 660 is used, for example, when measuring an object, such as thickness of a rotor, that is located between the facing surfaces 626, 646 of the respective first and second projections 624, 644.

The rotor indicia 660 includes the graduated rotor rule portion 662 on the first member 602 that has markings calibrated to indicate the relative distance between the surfaces 626, 646 of the respective first and second projections 624, 644. For example, when the first and second inner surfaces 626, 646 of the respective first and second projections 624, 644 are brought into engagement, the rotor rule pointer 664 would be pointing to the "0" marking on the graduated rotor rule portion 662.

For another example, when measuring an object or brake component located between the first and second projections 624, 644, such as a brake rotor, the surfaces 626, 646 of the respective first and second projections are brought into engagement with opposite sides of the rotor. The rotor pointer 664 is located adjacent to a particular number on the graduated rotor rule portion 662 on the first member 602. The markings on the graduated rotor rule portion 662 correspond to the distance between the surfaces 626, 646 of the respective first and second projections 624, 644 when measuring an object or component located between the first and second projections, such as rotor thickness. For example, when the surfaces 626, 646 of the respective first and second projections 624, 644 are spaced apart a distance of 40 mm, the rotor rule pointer 664 would point to the "40" marking (FIG. 12) on the graduated rotor rule portion 662, so as to indicate a rotor thickness of about 40 mm.

Second or pad indicia 680 are provided on the first and second members 602, 604. The pad indicia 680 is graduated to indicate the relative distance between the first and second outer surfaces 628, 648 of the respective tips 622, 642. By way of example, the pad indicia 680 includes a pad rule portion 682 formed by suitable means, such as embossing, printing or laser etching, onto the handling section 610 of the first member 602. The pad indicia 680 also includes an indicator or pad rule pointer 684 (FIG. 18) formed in the handling section 610 of the second member 604 and that is visible in the window defined by the slot 610b in the first member 602.

The markings on the graduated pad rule portion 682 correspond to the distance between the surfaces 628, 648 of the respective first and second projections 624, 644. For example, if the first and second surfaces 626, 646 of the respective first and second projections 624, 644 are brought into engagement, the pad rule pointer 684 would be located adjacent the "8" marking on the graduated pad rule portion 682. This would occur since each of the tips 622, 642 have a width of approximately 4 mm at their respective projections 624, 644.

The pad indicia 680 is used, for example, when measuring spaced apart objects located outside of the first and second surfaces 628, 648. For example, in order to measure an object, such as the thickness of an inboard brake pad, an inspector or service technician would move the inboard brake pad against the rotor. The second surface 648 on the second tip 642 would be moved against, or as close as possible to, the rotor. The first surface 628 on the first tip 622 is moved against any suitable reference surface, such as the reference surface of the backing plate of the inboard brake pad. The marking in the pad rule portion 682 that the pad rule pointer 684 is directed at, represents the thickness of the inboard brake pad.

In order to measure an object, such as the thickness of an outboard brake pad, an inspector would move the outboard brake pad against, or as close as possible to, the rotor. The surface 628 on the first tip 622 would be moved against the rotor. The second surface 648 on the second tip 642 would be moved against any suitable reference surface, such as the reference surface of the backing plate of the outboard brake pad. For example, when the first and second surfaces 628, 648 are spaced apart a distance of 25 mm, the pad rule pointer 684 would point to the "25" marking on the graduated rotor rule portion 682, so as to indicate a friction pad thickness of about 25 mm.

The rotor and pad indicia 660, 680 are preferably separate from one another, but it is contemplated that the first and second rotor indicia could be combined. The rotor and pad indicia 660, 680 each have portions on both of the first and second members 602, 604 that work in concert during measurement of an object.

Figure 15:
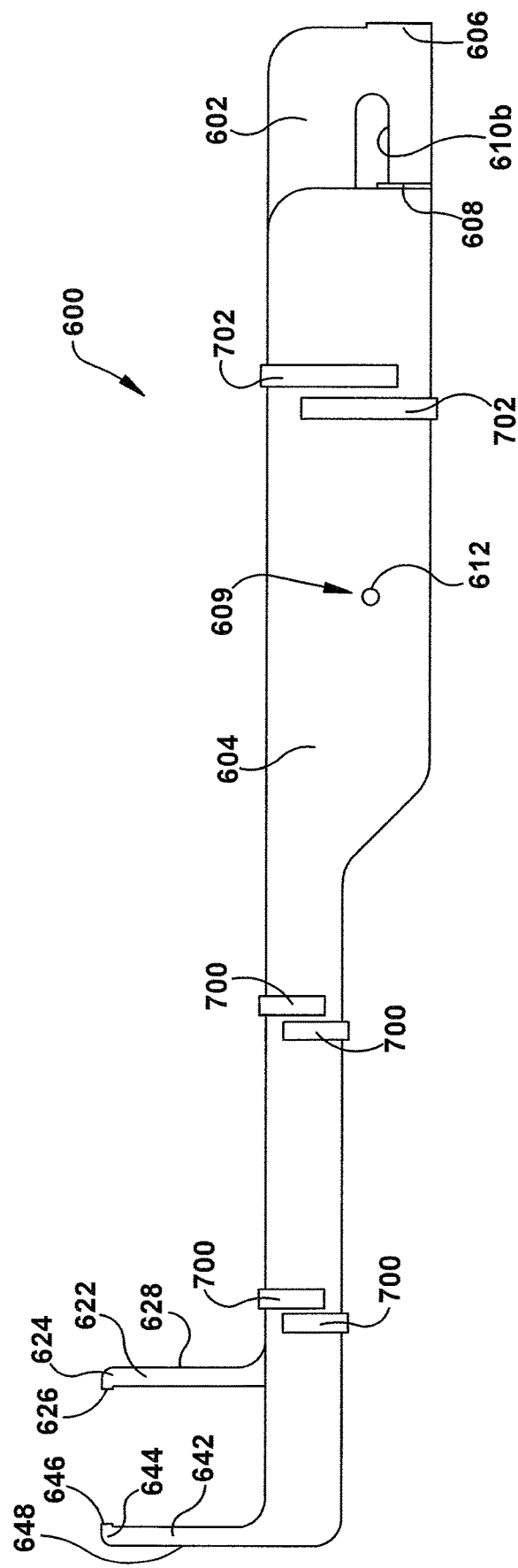
FIG. 15 is a back plan view of the tool illustrated in FIG. 12, illustrating retention tab structure.

The first member 602 includes a plurality of retention tabs 700, 702 (FIG. 17). The retention tabs 700, 702 are illustrated in FIG. 17 in the condition prior to deformation and assembly of the tool 600. That is, the retention tabs 700, 702 shown in FIG. 17 have not been bent over into a retaining position as illustrated in FIGS. 12 and 15. The retention tabs 700, 702 extend in a direction transversely outward of the longitudinal extent of the first member 602. The retention tabs 702 are relatively longer than the retention tabs 700. This because the retention tabs 702 have to traverse a relatively larger distance than the retention tabs 700 because they are located in the relatively larger handling section 610.

During manufacture of the tool 600, the second member 604 is overlaid onto the first member 602 (FIG. 15). The threaded projection 612 on the thumbwheel 614 is then inserted through the slot 610*a* of the first member 602 and into the threaded structure in the second member 604. The retention tabs 700, 702 on the first member 602 are then deformed or bent over edges of the second member 604. This retains the position of the second member 604 relative to the first member 602 and prevents relative movement or loosening in a direction transverse to the longitudinal extent of the tool 600 while permitting relative longitudinal movement. The thumbwheel 614, thus, may limit relative longitudinal movement between the first and second members 602, 604 to the length of the slot 610*a*. A portion of the thumbwheel 614 may also engage longitudinally extending side surfaces of the slot 610*a* to further limit transverse relative movement between the first and second members 602, 604 in addition to the tabs 700, 702.

The first and second members 602, 604 of the tool 600 may each include a deformed section 720 (FIG. 16) that nest together. The deformed sections 720 cooperate to keep the first and second members 602, 604 aligned during relative longitudinal movement and limit relative transverse movement. The deformed sections 720 may extend the entire length of the respective first and second members 602, 604 or any suitable lesser length. Each of the deformed sections 720 are formed to be of similar cross-sectional shape and size and extend perpendicular a relatively short distance from the respective first and second members 602, 604. The longitudinal extent of one of the deformed sections 720 may be longer than the other and preferably approximate the longitudinal extent of the slot 610*a*.

Prior to the overlaying operation, the end portions 606, 608 on each of the first and second members 602, 604 are bent into the condition or position as best seen in FIGS. 13-14. The bent end portions 606, 608 may be manually engaged by an operator of the tool 600. The bent end portions 606, 608 provide structure extending transversely in opposite directions from the first and second members to push and/or pull the first and second members relative to one another in a longitudinal or axial direction. Manual engagement with the bent end portions 606, 608 enhance or enable easy relative movement of the first and second members 602, 604 when the end portions are engaged.

The tool 600 allows for meaningful measurement in a relatively short amount of time of the thickness of the rotor between the wear areas and the thickness of both disc brake pads with the tire and wheel assembly mounted on the heavy-duty vehicle. Thus, the tool 600 overcomes disadvantages, limitations and drawbacks associated with the previously known brake component measuring tools. The tool 600 is not intended to be a high precision measuring instrument. The tool 600 is intended to be a quick but accurate and precise inspection measurement tool for service technicians, inspectors or others, to see how close the brake components are to the recommended wear out limits for a particular rotor and brake pad.

With a single tool 600, one is able to measure the thickness of the outboard brake pad, the thickness of the inboard brake pad and the thickness of the rotor. The measurements are sufficient enough to make a decision as to when to dismount the tire and wheel assembly and do a closer more detailed inspection or replace components before they are worn to an extent where they could suffer and/or cause damage. The tool 600 is relatively small, lightweight and easily deployable in a shop or in the field.

It is to be understood that the structure of the tool 100, 400, 600 for measuring components of heavy-duty vehicle air disc brakes may be altered or rearranged, or certain components omitted or added, without affecting the overall concept or operation of the disclosed concept. It is also to be understood that the disclosed concept finds application in all types of disc brake assemblies, including disc brake assemblies other than those shown and described herein, without affecting the concept or operation. While reference is made generally to a heavy-duty vehicle for the purpose of convenience, it has been with the understanding that such reference includes trucks, tractor-trailers or semi-trailers, and trailers thereof.

The disclosed concept is described with reference to specific aspects. It is understood that this description and associated illustration is by way of example and not by way of limitation. Potential modifications and alterations will occur to others upon a reading and understanding of this disclosure, and it is understood that the disclosed concept includes all such modifications and alterations and equivalents thereof.

Certain terminology may be used for purposes of reference only, and thus is not intended to be limiting. For example, terms such as "inboard" and "outboard" describe the position relative to the heavy-duty vehicle. Such terminology may include the words specifically mentioned above, derivatives thereof, and words of similar import.

What is claimed is:

1. A tool for measuring dimensions of disc brake components without removing a mounted wheel associated with the disc brake components to be measured, the tool comprising:
   a substantially planar elongated first member having a first tip extending transversely from the first member, the first tip having a first projection at an end portion of the first tip;
   a substantially planar elongated second member being relatively movable to the first member, the second member having a second tip extending transversely from the second member in the same direction that the first tip of the first member extends, the second tip having a second projection at an end portion of the second tip, a planar portion of the first member overlying and engaging a planar portion of the second member;
   the overlying first and second members sized to fit between disc brake components to be measured and an associated mounted wheel;
   first indicia on the first and second members to indicate a first relative distance between surfaces of the first and second tips when measuring an object located between the first and second projections; and
   second indicia on the first and second members to indicate a second relative distance between the first and second projections when measuring spaced apart objects located outside of the first and second projections.

2. The tool of claim 1 wherein the object located between the first and second projections is a rotor with unworn ridge areas at radially outer edges of a first dimension, the first and second projections extend transversely from respective first and second tips for a distance greater than the first dimension.

3. The tool of claim 1 wherein the first and second projections extend in respective directions toward one another when measuring a thickness of a rotor.

4. The tool of claim 1 wherein the first and second projections extend in respective directions away from one another when measuring a thickness of a brake pad.

5. The tool of claim 1 wherein the first and second indicia are graduated and located on opposite sides of a slot in the first member.

6. The tool of claim 1 further including structure located at the transverse edges of the first and second members to secure the first and second members together and enable relative movement in a direction along the longitudinal extents of the first and second members.

7. The tool of claim 6 wherein the structure comprises retention tabs fixed to transverse edges of one of the first and second members, the tabs are formed about transverse edges of the other of the first and second members to limit relative movement in a direction transverse to the longitudinal extents of the first and second members.

8. The tool of claim 1 further including a bent end portion on at least one of the first and second members for manual engagement to relatively move the first and second members.

9. The tool of claim 1 further including a thumbwheel operatively connected with threaded structure fixed to one of the first and second members and engageable with the other of the first and second members to inhibit relative movement between the first and second members upon tightening of the thumbwheel against the other of the first and second members.

10. The tool of claim 1 wherein a thickness of each of the first and second tips is sized to fit between a rotor and a brake pad.

11. A tool for measuring thicknesses of disc brake components of a heavy-duty vehicle without removing a wheel associated with the disc brake components to be measured, the tool comprising:
    an elongated first member having a first tip extending transversely from the first member, the first tip having a first projection at an end portion of the first tip;
    an elongated second member is movable relative to the first member, the second member having a second tip extending transversely from the second member in the same direction as the first tip of the first member, the second tip having a second projection at an end portion of the second tip;
    first indicia on the first and second members graduated to indicate a relative distance between the first and second projections when measuring an object located between the first and second projections;
    second indicia on the first and second members graduated to indicate a relative distance between surface of the first and second tips when measuring spaced apart objects located outside of the first and second projections; and
    retention tabs located on one of the first or second members, the retention tabs being formed over the other of the first or second members to retain the first and second members from relative movement in a direction transverse to the longitudinal extent of the first and second members.

12. The tool of claim 11 wherein the retention tabs extend in a direction transverse to the longitudinal extent of the measuring tool.

13. The tool of claim 11 further including a bent end portion on at least one of the first and second members for manual engagement to relatively move the first and second members.

14. The tool of claim 11 further including a thumbwheel engageable with threaded structure to inhibit relative movement between the first and second members upon tightening of the thumbwheel.

15. A method of measuring dimensions of components in a heavy-duty vehicle air disc brake assembly without requiring removal of a mounted wheel from an associated air disc brake system, the measuring accomplished with a tool having relatively movable substantially planar first and second members at least partially overlying one another, the first and second members having respective first and second tips extending transversely from the first member and having respective first and second indicia to indicate a relative distance between surfaces of the first and second tips, the method comprising the steps of:
    inserting the portions of the first and second members into an access area of the air disc brake system between a mounted wheel and components of a heavy-duty vehicle air disc brake assembly;
    moving the portions of the first and second members relative to one another so surfaces of the first and second tips of the first and second members are positioned relative to one another;
    then moving the tips of the first and second members relative to one another so surfaces of the tips engage respective surfaces of the air disc brake assembly to be measured; and
    then reading the dimension of the measured component of the air disc brake assembly directly from one of the first and second indicia.

16. The method of claim 15 for measuring a thickness of a disc brake rotor further includes the steps:
    moving the first and second members relative to one another so surfaces of the portions are spaced apart a distance greater than a thickness of the disc brake rotor to be measured;
    then moving the first and second members so the surfaces of the portions engage opposite facing surfaces of the rotor; and
    reading the thickness of the rotor from graduated markings of the first indicia.

17. The method of claim 16 wherein the surfaces of the portions are defined by projections extending from the respective portions and in respective directions toward one another.

18. The method of claim 15 for measuring an approximate thickness of a disc brake pad further includes the steps:
    moving the disc brake pad proximate the rotor;
    moving the first and second members relative to one another so the surfaces of the first and second portions are spaced apart a distance less than the thickness of the disc brake pad to be measured;
    then moving the first and second members so the portions of the first and second members engage a surface of the rotor and a reference surface of a disc brake pad to be measured; and
    reading the thickness of the brake pad from graduated markings of the second indicia.

19. The method of claim 18 wherein the surfaces of the portions are defined by tips with surfaces facing in respective directions away from one another.

* * * * *